United States Patent
Ikedo et al.

(10) Patent No.: US 10,947,886 B2
(45) Date of Patent: Mar. 16, 2021

(54) CATALYST STATE ESTIMATION APPARATUS, CATALYST STATE ESTIMATION METHOD WITH INFORMATION PROCESSING APPARATUS, AND NON-TRANSITORY RECORDING MEDIUM IN WHICH PROGRAM IS STORED

(71) Applicant: TOYOTA JIDOSHA KABUSHIKI KAISHA, Toyota (JP)

(72) Inventors: Takato Ikedo, Nagakute (JP); Matsuei Ueda, Nagakute (JP); Makoto Nagaoka, Nagakute (JP); Harufumi Muto, Miyoshi (JP); Kohei Mori, Toyota (JP); Hitoshi Hosaki, Aichi-gun (JP); Atsushi Nagai, Toyota (JP); Satoshi Takamoto, Miyoshi (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 123 days.

(21) Appl. No.: 16/359,282

(22) Filed: Mar. 20, 2019

(65) Prior Publication Data
US 2019/0292970 A1 Sep. 26, 2019

(30) Foreign Application Priority Data

Mar. 21, 2018 (JP) .............................. JP2018-053672
Nov. 19, 2018 (JP) .............................. JP2018-216272

(51) Int. Cl.
*F01N 11/00* (2006.01)
*F01N 13/00* (2010.01)
*F01N 3/20* (2006.01)

(52) U.S. Cl.
CPC ........ *F01N 11/002* (2013.01); *F01N 13/0093* (2014.06); *F01N 3/2066* (2013.01);
(Continued)

(58) Field of Classification Search
CPC ...... F01N 3/2066; F01N 3/208; F01N 11/002; F01N 2610/02; F01N 2900/1621; F01N 2900/1622
See application file for complete search history.

(56) References Cited

U.S. PATENT DOCUMENTS

| 2003/0216855 A1 | 11/2003 | Liang et al. |
| 2011/0232263 A1 | 9/2011 | Yasui et al. |
| 2020/0224570 A1* | 7/2020 | Daniel .................... F01N 3/208 |

FOREIGN PATENT DOCUMENTS

| CN | 104314650 A | 1/2015 |
| JP | 2003-328732 | 11/2003 |

(Continued)

OTHER PUBLICATIONS

Machine translation of JP 2014206150 A, accessed Sep. 24, 2020. (Year: 2020).*

*Primary Examiner* — Jonathan R Matthias
(74) *Attorney, Agent, or Firm* — Oblon, McClelland, Maier & Neustadt, L.L.P.

(57) ABSTRACT

A catalyst state estimation apparatus includes a first sensor, a memory and a processor. The first sensor is configured to acquire information about a catalyst that removes a toxic substance in an exhaust gas, the first sensor being provided in a main passage into which the exhaust gas flows from an internal combustion engine. The memory is configured to previously store a catalyst state estimation model that includes at least one mathematical model. The processor is configured to estimate a removal performance of the catalyst by applying the information about the catalyst acquired by the first sensor to the catalyst state estimation model.

18 Claims, 11 Drawing Sheets

(52) U.S. Cl.
 CPC ....... *F01N 11/005* (2013.01); *F01N 2560/026* (2013.01); *F01N 2560/06* (2013.01); *F01N 2560/07* (2013.01); *F01N 2900/0402* (2013.01); *F01N 2900/1404* (2013.01); *F01N 2900/1411* (2013.01); *F01N 2900/1614* (2013.01); *F01N 2900/1621* (2013.01); *F01N 2900/1622* (2013.01); *F01N 2900/1812* (2013.01)

(56) References Cited

FOREIGN PATENT DOCUMENTS

| | | | |
|---|---|---|---|
| JP | 2006-242094 | A | 9/2006 |
| JP | 2009-180086 | | 8/2009 |
| JP | 2011-132915 | | 7/2011 |
| JP | 2014206150 | A * | 10/2014 |
| JP | 6268688 | B1 | 1/2018 |

* cited by examiner

INPUT LAYER    INTERMEDIATE LAYER    OUTPUT LAYER

CATALYST STATE ESTIMATION APPARATUS, CATALYST STATE ESTIMATION METHOD WITH INFORMATION PROCESSING APPARATUS, AND NON-TRANSITORY RECORDING MEDIUM IN WHICH PROGRAM IS STORED

INCORPORATION BY REFERENCE

The disclosure of Japanese Patent Application No. 2018-216272 filed on Nov. 19, 2018 including the specification, drawings and abstract is incorporated herein by reference in its entirety.

BACKGROUND

1. Technical Field

The present disclosure relates to a catalyst state estimation apparatus, a catalyst state estimation method with an information processing apparatus, and a non-transitory recording medium in which a program is stored.

2. Description of Related Art

There is known a technology of quantitatively predicting phenomena under various conditions using a mathematical model. As one of such mathematical models, there is known a neural network (NN) in which a neuron network in the human brain is expressed as a mathematical artificial neuron model.

For example, Japanese Patent Application Publication No. 2003-328732 (JP 2003-328732 A) describes that a NN receives values of an ambient temperature, a manifold pressure, a manifold temperature, a fuel consumption rate and an engine speed and predicts the amount of nitrogen oxide (NOx) that is discharged from a selective catalytic reduction catalyst (SCR catalyst). For example, Japanese Patent Application Publication No. 2009-180086 (JP 2009-180086 A) describes that a NN receives values of an EGR valve lift amount command value, a boost pressure, an intake air temperature, an exhaust gas pressure, a fuel injection amount, an intake air flow rate and an engine speed and predicts the amount of NOx that is trapped by a NOx storage reduction catalyst (NSR catalyst). For example, Japanese Patent Application Publication No. 2011-132915 (JP 2011-132915 A) describes that a NN receives values of an engine speed, a fuel injection amount, a fuel injection timing, an intake air amount, an air-fuel ratio, an exhaust gas temperature and a boost pressure and predicts the amount of NOx that is discharged from an engine.

SUMMARY

In the meantime, there is known a removal of an exhaust gas of an internal combustion engine by using various catalysts having different functions, as exemplified by the SCR catalyst, the NSR catalyst, a three-way catalyst, a particulate matter removal filter (DPF: Diesel Particulate Filter), an oxidation catalyst (DOC catalyst: Diesel Oxidation Catalyst), alone or in combination. There has been a demand to estimate (predict) a removal performance of such a catalyst, using a mathematical model.

However, in each of the technologies described in JP 2003-328732 A, JP 2009-180086 A and JP 2011-132915 A, only parameters relevant to the internal combustion engine (engine) and an intake system of the engine are considered as inputs to the NN. Here, the removal performance of the catalyst varies by influence of the temperature of the catalyst, the amount of an additive agent that is adsorbed in the catalyst, or the like, and therefore, each of the technologies described in JP 2003-328732 A, JP 2009-180086 A and JP 2011-132915 A has a problem in that the removal performance of the catalyst cannot be accurately estimated.

Further, in each of the technologies described in JP 2003-328732 A, JP 2009-180086 A and JP 2011-132915 A, there is not considered the estimation of the removal performance of a plurality of catalysts in a configuration in which the exhaust gas of the internal combustion engine is purged using the plurality of catalysts (for example, a configuration in which two or more SCR catalysts are provided).

The disclosure increases the accuracy of the estimation in the technology of estimating the removal performance of the catalyst that purges the exhaust gas of the internal combustion engine.

The disclosure has been made for solving at least one of the above-described problems, and can be realized as the following forms.

A first aspect of the disclosure is a catalyst state estimation apparatus. The catalyst state estimation apparatus includes a first sensor, a memory and a processor. The first sensor is configured to acquire first information about a catalyst that removes a toxic substance in an exhaust gas, the first sensor being provided in a main passage into which the exhaust gas flows from an internal combustion engine. The memory is configured to previously store a catalyst state estimation model that includes at least one mathematical model. The processor is configured to estimate a removal performance of the catalyst by applying the first information about the catalyst acquired by the first sensor to the catalyst state estimation model.

The removal performance of the catalyst varies by influence of the information about the catalyst (for example, the temperature of the catalyst, or the amount of an additive agent that is adsorbed in the catalyst). With the above configuration, the processor applies the information about the catalyst that influences the removal performance of the catalyst, to the catalyst state estimation model, and thereby, can accurately estimate the removal performance of the catalyst. That is, with the above configuration, it is possible to increase the accuracy of the estimation in the technology of estimating the removal performance of the catalyst that purges the exhaust gas of the internal combustion engine.

The catalyst state estimation apparatus may further include a second sensor configured to acquire second information about the exhaust gas that flows into the catalyst. The processor may be configured to estimate the removal performance of the catalyst by further applying the second information about the exhaust gas acquired by the second sensor to the catalyst state estimation model in addition to the first information about the catalyst. With the above configuration, the processor applies both of the information about the catalyst and the information about the exhaust gas that flows into the catalyst, each of which is information to influence the removal performance of the catalyst, to the catalyst state estimation model, and thereby, can further accurately estimate the removal performance of the catalyst.

The catalyst state estimation apparatus may further include a third sensor configured to acquire third information about an additive agent that is supplied to the catalyst. The processor may be configured to estimate the removal performance of the catalyst by further applying the third information about the additive agent acquired by the third sensor to the catalyst state estimation model in addition to the first information about the catalyst. With the above configuration, it is possible to further increase the accuracy of the estimation, in the case of estimating the removal performance of the catalyst that removes the toxic substance using the additive agent, as exemplified by a selective catalytic reduction catalyst and a NOx storage reduction catalyst.

In the catalyst state estimation apparatus, the catalyst state estimation model may include a first model configured by a machine learning model. The first model may receive at least one of the temperature of a front end of the catalyst in the main passage, the temperature of the catalyst and the adsorption amount of an additive agent that is adsorbed in the catalyst at a last time, as the first information about the catalyst, and may output the removal efficiency for nitrogen oxide in the catalyst. The processor may be configured to estimate the removal efficiency for the nitrogen oxide as the removal performance of the catalyst, using the first model. If there is a causal relation between an input variable and an output variable, the machine learning model can obtain an output (estimation result) at a low computation load, even in a case where classification or regression requires a complex function approximation (for example, a case where a phenomenon that is difficult to be expressed by a physical formula is included, a case where a plurality of physical formulas is needed for describing a phenomenon, or a case where inputs to a physical formula increase on the assumption of influence of a large number of factors). With the above configuration, the processor estimates the removal efficiency for the nitrogen oxide, using the first model configured by the machine learning model, and therefore, can estimate the removal efficiency for the nitrogen oxide that is influenced by a large number of factors, at a low computation load and a high speed. Further, by adopting a machine learning model after sufficient learning as the first model, the processor can estimate the removal efficiency for the nitrogen oxide at a high accuracy.

In the catalyst state estimation apparatus, the catalyst state estimation model may include a second model configured by a machine learning model. The second model may receive at least one of the temperature of a front end of the catalyst in the main passage, the temperature of the catalyst, the adsorption amount of an additive agent that is adsorbed in the catalyst at a last time, the time derivative value of the temperature of the catalyst and the ratio of the adsorption amount to a saturated adsorption amount of the additive agent in the catalyst, as the first information about the catalyst, and may output the outflow amount of the additive agent that flows out of the catalyst. The processor may be configured to estimate the outflow amount as the removal performance of the catalyst, using the second model. With the above configuration, the processor estimates the outflow amount of the additive agent that flows out of the catalyst, using the second model configured by the machine learning model, and therefore, can estimate the outflow amount that is influenced by a large number of factors, at a low computation load and a high speed. Further, by adopting a machine learning model after sufficient learning as the second model, the processor can estimate the outflow amount at a high accuracy.

In the catalyst state estimation apparatus, the catalyst state estimation model may include a third model configured by a physical model. The third model may receive at least one of the temperature of a front end of the catalyst in the main passage and the temperature of the catalyst, as the first information about the catalyst, and may output the amount of an additive agent that does not contribute to a removal reaction of nitrogen oxide in the catalyst. The processor may be configured to estimate the amount of the additive agent that does not contribute to the removal reaction of the nitrogen oxide in the catalyst as the removal performance of the catalyst, using the third model. The physical model is a law that holds by similitude based on an actual physical law, and therefore, the output (estimation result) to be obtained by the physical model satisfies the physical law. On the other hand, the machine learning model is a model that is constructed as a result of learning of enormous data, and therefore, the output (estimation result) satisfying the physical law is not obtained in some cases. With the above configuration, the processor estimates the amount of the additive agent that does not contribute to the removal reaction of the nitrogen oxide in the catalyst, using the third model configured by the physical model, and therefore, it is possible to estimate the amount of the additive agent that is influenced by a small number of factors, at a high accuracy, in accordance with the physical law.

In the catalyst state estimation apparatus, the catalyst state estimation model may be a model that receives the removal efficiency for the nitrogen oxide at a current time that is estimated by the first model, the outflow amount at the current time that is estimated by the second model and the amount of the additive agent at the current time that does not contribute to the removal reaction of the nitrogen oxide in the catalyst and that is estimated by the third model, and evaluates the adsorption amount of the additive agent in the catalyst at a next time, using a physical law. The processor may be configured to estimate the adsorption amount at the next time as the removal performance of the catalyst, using the catalyst state estimation model. With the above configuration, the processor concurrently uses the estimation results (the removal efficiency for the nitrogen oxide and the outflow amount of the additive agent that flows out of the catalyst) of the first and second models, each of which is a machine learning model, and the estimation result (the amount of the additive agent that does not contribute to the removal reaction of the nitrogen oxide in the catalyst) of the third model, which is a physical model, and estimates the adsorption amount of the additive agent in the catalyst, using the physical law. Therefore, with the above configuration, it is possible to estimate the adsorption amount that is influenced by a larger number of factors, at a high accuracy and a high speed, with the satisfaction of the physical law. Further, the adsorption amount of the additive agent in the catalyst varies by influence of the adsorption amount at the previous time (in other words, by influence of a time history). With the above configuration, the processor estimates the adsorption amount at the next time, using the current estimation results of the first to third models, and therefore, can estimate the removal performance of the catalyst at the next time, at a high accuracy, in light of the removal performance of the catalyst at the previous time.

In the catalyst state estimation apparatus, the first model and the second model further may receive at least one of the temperature of the exhaust gas, the flow rate of the exhaust gas and the amount of the nitrogen oxide that is contained in the exhaust gas, as second information about the exhaust gas, and may receive the inflow amount of the additive agent that flows into the catalyst, as third information about the additive agent. The third model further may receive the temperature of the exhaust gas, as the second information about the exhaust gas, and may receive the inflow amount of the additive agent that flows into the catalyst, as the third information about the additive agent. With the above configuration, in the first to third models, the estimation is performed in consideration of a variety of information, and therefore, it is possible to estimate the removal performance of the catalyst at a further higher accuracy.

In the catalyst state estimation apparatus, the catalyst state estimation model may include a plurality of the first models and a plurality of the second models. The plurality of the first models may be created using training data acquired from a plurality of the catalysts having different deterioration degrees. The plurality of the second models may be created using the training data. With the above configuration, the catalyst state estimation model includes the first models and second models that are created using the training data acquired from the catalysts having different deterioration degrees, and therefore, it is possible to employ an optimal first model and second model depending on the deterioration degree of the catalyst. As a result, with the above configuration, it is possible to estimate the removal performance of the catalyst at a further higher accuracy.

In the catalyst state estimation apparatus, the first sensor may be configured to acquire at least the first information about the catalyst positioned on a most upstream side in the main passage when a plurality of the catalysts is provided in the main passage, the plurality of the catalysts being an identical type of catalysts. The processor may be configured to estimate the removal performance of a whole of the plurality of the catalysts by applying the first information about the catalyst acquired by the first sensor to the catalyst state estimation model. With the above configuration, when the plurality of the catalysts is provided in the main passage, the processor can estimate the removal performance of the whole of the plurality of the catalyst in the main passage, by applying the information about the catalyst positioned on the most upstream side to the catalyst state estimation model. That is, with the above configuration, it is possible to estimate the removal performance by regarding the plurality of the catalysts in the main passage as one catalyst. Therefore, compared to the case of estimating each removal performance of the catalysts, it is possible to decrease the number of sensors and the like for the information about the catalyst and to decrease the number of catalyst state estimation models that are previously prepared, and it is possible to reduce the computation load in the catalyst state estimation apparatus. Further, when the plurality of catalysts provided in the main passage is an identical type of catalysts, the processor estimates the removal performance by regarding the catalysts as one catalyst. In the case of an identical type of catalysts, there is no difference in information item (for example, the temperature of the catalyst, or the amount of the additive agent that is adsorbed in the catalyst) about the catalyst that affects the removal performance, and therefore, the processor can accurately estimate the removal performance.

In the catalyst state estimation apparatus, the catalyst state estimation model may include a first model configured by a machine learning model. The first model may receive at least one of the temperature of a front end of the catalyst positioned on the most upstream side, the temperatures of the catalysts and the total of the adsorption amounts of an additive agent that is adsorbed in the plurality of the catalysts at a last time, as the first information about the catalyst, and may output the total of the removal amounts of nitrogen oxide in the plurality of the catalysts. The processor may be configured to estimate the total of the removal amounts of the nitrogen oxide as the removal performance, using the first model. With the above configuration, the processor estimates the total of the removal amounts of the nitrogen oxide in the plurality of the catalysts, using the first model configured by the machine learning model, and therefore, can estimate the removal amount of the nitrogen oxide that is influenced by a large number of factors, at a low computation load and a high speed. Further, by adopting a machine learning model after sufficient learning as the first model, the processor can estimate the removal efficiency for the nitrogen oxide at a high accuracy.

In the catalyst state estimation apparatus, the catalyst state estimation model may include a second model configured by a machine learning model. The second model may receive at least one of the temperature of a front end of the catalyst positioned on the most upstream side, the temperatures of the catalysts, the total of the adsorption amounts of an additive agent that is adsorbed in the plurality of the catalysts at a last time, the time derivative values of the temperatures of the catalysts and the ratio of the total of the adsorption amounts to the total of the saturated adsorption amounts of the additive agent in the plurality of the catalysts, as the first information about the catalyst, and may output the outflow amount of the additive agent that flows out of the catalyst positioned on a most downstream side in the main passage. The processor may be configured to estimate the outflow amount of the removal performance, using the second model. With the above configuration, the processor estimates the outflow amount of the additive agent that flows out of the catalyst positioned on the most downstream side, using the second model configured by the machine learning model, and therefore, can estimate the outflow amount that is influenced by a larger number of factors, at a low computation load and a high speed. Further, by adopting a machine learning model after sufficient learning as the second model, the processor can estimate the outflow amount at a high accuracy.

In the catalyst state estimation apparatus, the catalyst state estimation model may include a third model configured by a physical model. The third model may receive at least one of the temperature of a front end of the catalyst positioned on the most upstream side and the temperatures of the catalysts, as the first information about the catalyst, and may output the amount of an additive agent that is supplied to the catalyst positioned on the most upstream side and that does not contribute to a removal reaction of nitrogen oxide in the plurality of the catalysts. The processor may be configured to estimate the amount of the additive agent that does not contribute to the removal reaction of the nitrogen oxide as the removal performance, using the third model. With the above configuration, the processor estimates the amount of the additive agent that is supplied to the catalyst positioned on the most upstream side and that does not contribute to the removal reaction of the nitrogen oxide in the plurality of the catalysts, using the third model configured by the physical model, and therefore, can estimate the amount of the additive agent that is influenced by a small number of factors, at a high accuracy, in accordance with the physical law.

In the catalyst state estimation apparatus, the catalyst state estimation model may be a model that receives the total of the removal amount of the nitrogen oxide at a current time that is estimated by the first model, the outflow amount at the current time that is estimated by the second model and the amount of the additive agent at the current time that does not contribute to the removal reaction of the nitrogen oxide and that is estimated by the third model, and evaluates the total of the adsorption amounts of the additive agent that is adsorbed in the plurality of the catalysts at a next time, using a physical law. The processor may be configured to estimate the total of the adsorption amounts at the next time as the removal performance, using the catalyst state estimation model. With the above configuration, the processor concurrently uses the estimation results (the total of the removal amounts of the nitrogen oxide in the plurality of catalysts and the outflow amount of the additive agent that flows out of the catalyst positioned on the most downstream side) of the first and second models, each of which is a machine learning model, and the estimation result (the amount of the additive agent that is supplied to the catalyst positioned on the most upstream side and that does not contribute to the removal reaction of the nitrogen oxide in the plurality of the catalysts) of the third model, which is a physical model, and estimates the total of the adsorption amounts of the additive agent that is adsorbed in the plurality of the catalysts, using the physical law. Therefore, with the above configuration, it is possible to estimate the total of the adsorption amounts that are influenced by a larger number of factors, at a high accuracy and a high speed, with the satisfaction of the physical law. Further, the total of the adsorption amounts of the additive agent that is adsorbed in the plurality of the catalysts varies by influence of the total of the adsorption amounts at the previous time (in other words, by influence of a time history). With this configuration, the processor estimates the total of the adsorption amounts at the next time, using the current estimation results of the first to third models, and therefore, can estimate the removal performance of the catalyst at the next time, at a high accuracy, in light of the removal performance of the catalyst at the previous time.

The catalyst state estimation apparatus may further include a second sensor configured to acquire second information about the exhaust gas that flows into the catalyst positioned on the most upstream side and a third sensor configured to acquire third information about the additive agent that is supplied to the catalyst positioned on the most upstream side. The first model and the second model further may receive at least one of the temperature of the exhaust gas, the flow rate of the exhaust gas and the amount of the nitrogen oxide that is contained in the exhaust gas, as the second information about the exhaust gas, and may receive the inflow amount of the additive agent that flows into the catalyst positioned on the most upstream side, as the third information about the additive agent. The third model further may receive the temperature of the exhaust gas, as the second information about the exhaust gas, and may receive the inflow amount of the additive agent that flows into the catalyst positioned on the most upstream side, as the third information about the additive agent. The removal performance of the catalyst varies by influence of the information (for example, the temperature of the exhaust gas, the flow rate of the exhaust gas and the amount of the nitrogen oxide in the exhaust gas) about the exhaust gas that flows into the catalyst and influence of information (for example, the amount of the additive agent) about the additive agent, in addition to the influence of the information about the catalyst. With the above configuration, the processor can estimate further accurately the removal performance of the catalyst, by applying the information about the catalyst, the information about the exhaust gas and the information about the additive agent that influence the removal performance of the catalyst, to the catalyst state estimation model.

In the catalyst state estimation apparatus, the catalyst state estimation model may include at least one model of the first model and the second model that are created using training data acquired from a catalyst group. The catalyst group may be constituted by a plurality of the catalysts that is disposed in a main passage for an exemplar, the plurality of the catalysts being the identical type of catalysts, and in the catalyst group, an inlet of the catalyst positioned on a most upstream side in the main passage for the exemplar may be regarded as an inlet of the catalyst group, and an outlet of the catalyst positioned on a most downstream side in the main passage for the exemplar may be regarded as an outlet of the catalyst group. With the above configuration, the learning is performed while the plurality of catalysts disposed in the main passage for the exemplar is regarded as one catalyst (catalyst group), and thereby, it is possible to construct the first model and/or second model of the catalyst state estimation model. Therefore, in the first model and/or second model of the catalyst state estimation model, it is possible to add influence of the main passage (an exhaust pipe or the like) between catalysts that belong to the catalyst group. By using the catalyst state estimation model constructed in this way, the processor can accurately estimate the removal performance of the whole of the plurality of the catalysts, without the information about the exhaust pipe or the like between the catalysts in the main passage.

The catalyst state estimation apparatus may further include a temperature estimation unit that estimates, from the temperature of the catalyst positioned on the most upstream side, the temperature of another catalyst of the catalysts provided in the main passage. With the above configuration, from the temperature of the catalyst positioned on the most upstream side, the temperature estimation unit can estimate the temperature of the other catalyst provided in the main passage, and therefore, it is possible to exclude a sensor or the like that acquires the temperature of the other catalyst.

A second aspect of the disclosure is a catalyst state estimation method with an information processing apparatus. The information processing apparatus includes: a sensor that is provided in a main passage into which an exhaust gas flows from an internal combustion engine; a memory that previously stores a catalyst state estimation model including at least one mathematical model; and a processor. The catalyst state estimation method includes: acquiring, by the sensor, information about a catalyst that removes a toxic substance in the exhaust gas; and estimating, by the processor, a removal performance of the catalyst by applying the information about the catalyst to the catalyst state estimation model.

A third aspect of the disclosure is a non-transitory recording medium in which a program is stored. The program causes a computer to execute an acquisition step and an estimation step. The acquisition step is a step in which a sensor acquires information about a catalyst that removes a toxic substance in an exhaust gas. The estimation step is a step in which a processor estimates a removal performance of the catalyst by applying the information about the catalyst to a catalyst state estimation model. The catalyst state estimation model includes at least one mathematical model and is previously stored in a memory.

The disclosure can be realized as various aspects, and for example, can be realized as aspects such as a catalyst state estimation apparatus and system, an exhaust gas control apparatus and exhaust gas control system including a catalyst state estimation apparatus, a control method for the apparatuses and the systems, a computer program that is executed in the apparatuses and the systems, and a server apparatus for distributing the computer program.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
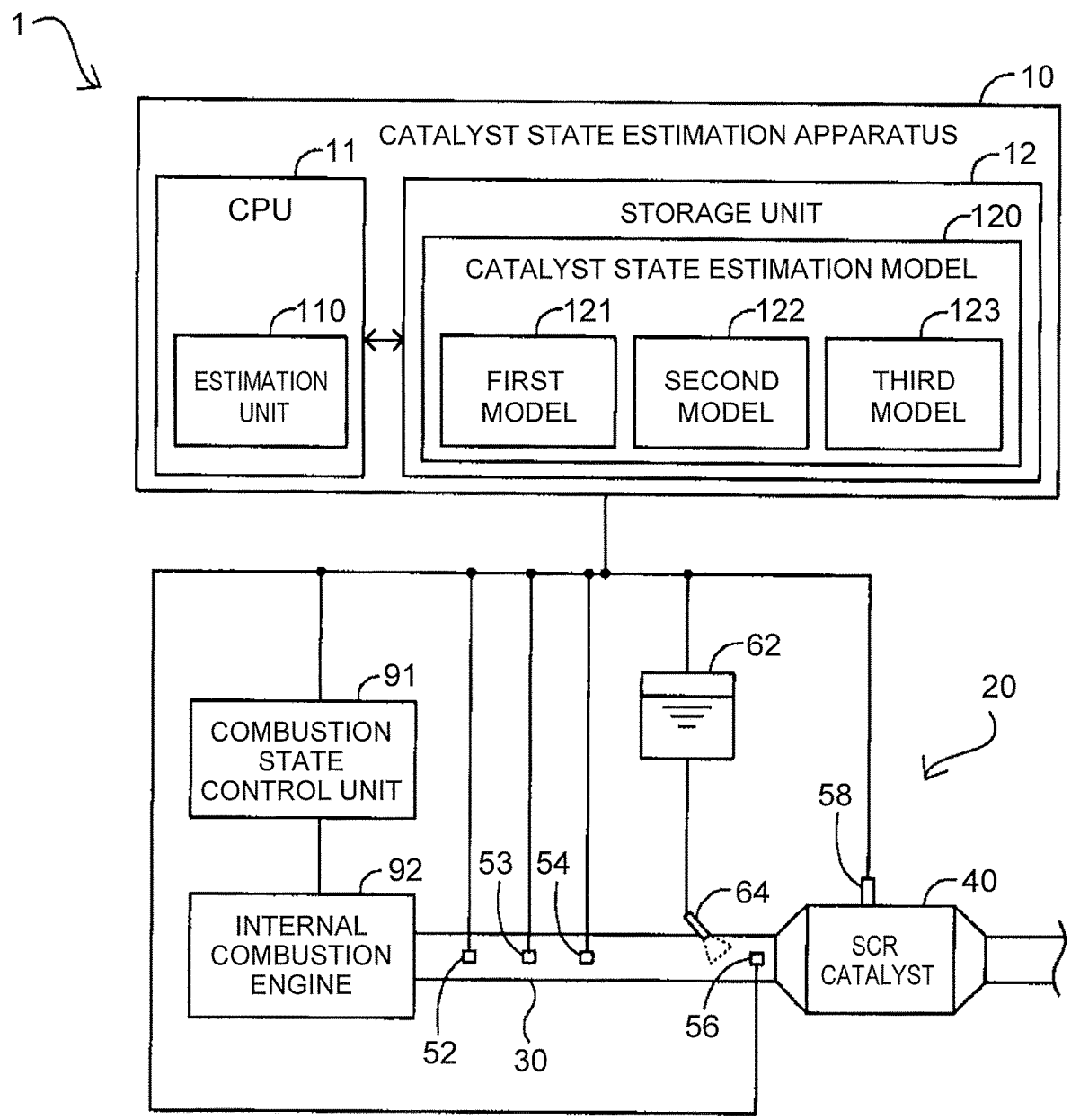
FIG. 1 is a block diagram of an exhaust gas control system in an embodiment of the disclosure.

FIG. 1 is a block diagram of an exhaust gas control system 1 in an embodiment of the disclosure. An exhaust gas control system 1 in the embodiment includes a combustion state control unit 91, an internal combustion engine 92, an exhaust gas control apparatus 20 and a catalyst state estimation apparatus 10. The exhaust gas control apparatus 20 in the embodiment is an apparatus that removes a toxic substance (nitrogen oxide: NOx) in an exhaust gas of the internal combustion engine 92. The exhaust gas control apparatus 20 includes a selective catalytic reduction catalyst (SCR catalyst) 40 as a catalyst, and uses a urea water to produce ammonia (NH3) as an additive agent. The catalyst state estimation apparatus 10 in the embodiment can estimate the state of the SCR catalyst 40 mounted on the exhaust gas control apparatus 20, specifically, the removal performance of the SCR catalyst 40.

For example, the internal combustion engine 92 is a diesel engine or a lean burn type gasoline engine. The combustion state control unit 91 controls injection of air and fuel to the internal combustion engine 92, and thereby, controls the air-fuel ratio in the internal combustion engine 92, to a lean, stoichiometric or rich state. For example, the combustion state control unit 91 is implemented in an electronic control unit (ECU). Hereinafter, in the exhaust gas control apparatus 20, a side close to the internal combustion engine 92 is referred to as an "upstream side" and a side far from the internal combustion engine 92 is referred to as a "downstream side". In FIG. 1, the left side corresponds to the upstream side, and the right side corresponds to the downstream side.

The exhaust gas control apparatus 20 includes an exhaust pipe 30 that extends from the internal combustion engine 92, the SCR catalyst 40 that is provided in the exhaust pipe 30, a urea pump unit 62 and a urea nozzle 64. The exhaust pipe 30 forms a main passage into which the exhaust gas flows from the internal combustion engine 92. The exhaust gas from the internal combustion engine 92, through the main passage in the exhaust pipe 30, passes through the SCR catalyst 40, and is released to external air. The SCR catalyst 40 receives supply of the additive agent, and removes NOx in the exhaust gas. The SCR catalyst 40 is an example of the "catalyst". The urea pump unit 62 stores the urea water as the additive agent in the interior, and contains a pump that feeds the urea water to the urea nozzle 64. The urea nozzle 64, which is an injection tip for the urea water, is provided on the upstream side of the SCR catalyst 40, and supplies the urea water to the SCR catalyst 40.

The catalyst state estimation apparatus 10 includes a CPU 11, a memory (storage unit) 12, a flow rate acquisition unit 52, a NOx concentration acquisition unit 54, a front-end temperature acquisition unit 56 and a temperature acquisition unit 58. For example, the CPU 11 and the storage unit 12 are implemented in an ECU.

The CPU 11 expands and executes computer programs stored in a ROM, on a RAM, and thereby, controls units of the catalyst state estimation apparatus 10. In addition, the CPU 11, which functions as an estimation unit 110, receives acquisition values acquired from the flow rate acquisition unit 52, the NOx concentration acquisition unit 54, the front-end temperature acquisition unit 56 and the temperature acquisition unit 58, and executes an estimation process described later. The storage unit 12 is constituted by a flash memory, a memory card, a hard disk or the like. In the storage unit 12, a catalyst state estimation model 120 is previously stored. The catalyst state estimation model 120 includes a first model 121, a second model 122 and a third model 123.

Figure 2:
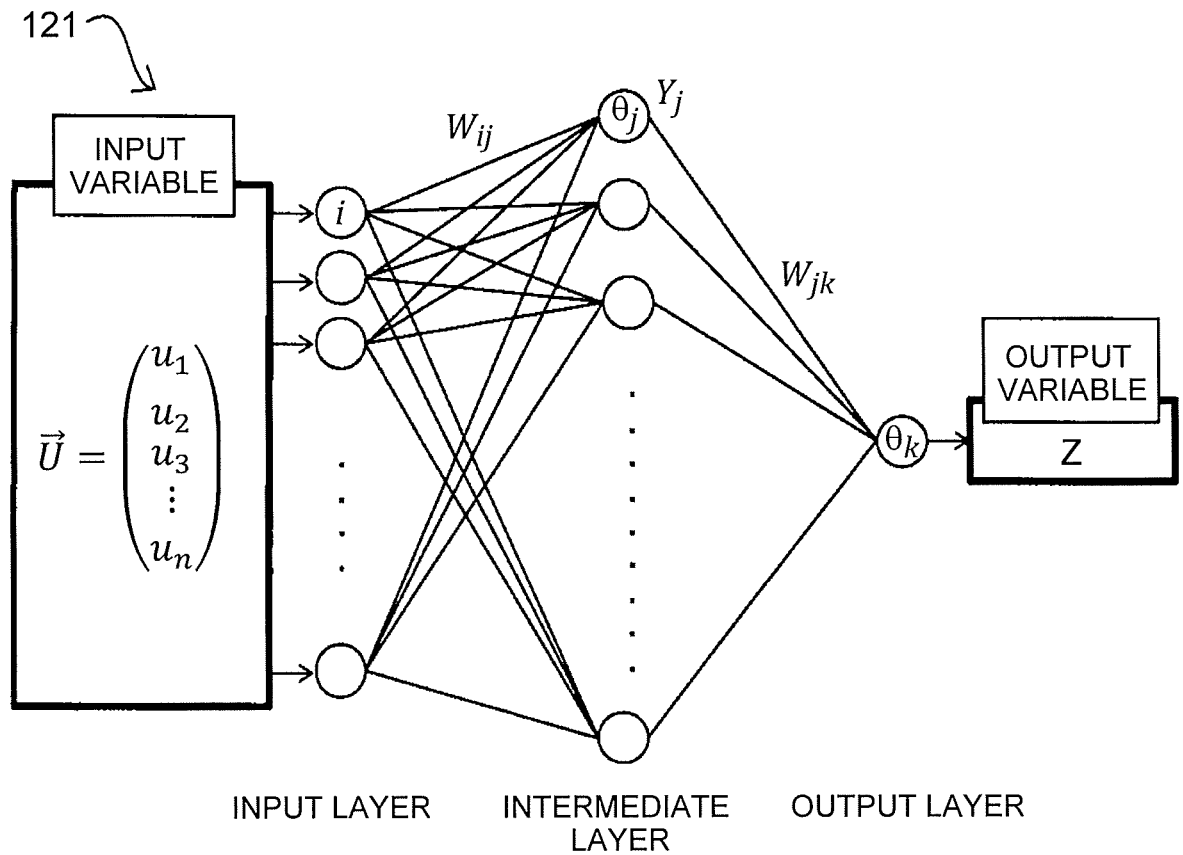
FIG. 2 is a diagram for describing a first model.

FIG. 2 is a diagram for describing the first model 121. The first model 121 is a model for estimating a NOx removal efficiency in the SCR catalyst 40, and is configured by a machine learning model, specifically, a neural network (NN). As shown in FIG. 2, the first model 121 in the embodiment is configured by three layers of an input layer, an intermediate layer and an output layer. As an example, a case where the intermediate layer is constituted by one layer and a sigmoid function is used as an element of the intermediate layer is shown. Incidentally, it is not necessary to use a sigmoid function as the element of the intermediate layer.

A vector U that is an input variable of the first model 121 is configured by n components (u1, u2, . . . , un; n is a natural number). As the components of the vector U, parameters shown in the following items a1 to a3 can be employed. (a1) Information about Catalyst: at least one of the temperature of a front end of the SCR catalyst 40, the temperature of the SCR catalyst 40, and the adsorption amount of NH3 that is adsorbed in the SCR catalyst 40 at the last time. (a2) Information about Exhaust Gas: at least one of the temperature of the exhaust gas from the internal combustion engine 92, the flow rate of the exhaust gas, and the amount of NOx that is contained in the exhaust gas. (a3) Information about Additive Agent: the inflow amount of NH3 that flows into the SCR catalyst 40

Here, as for the information about the catalyst shown in the item a1, at least one kind needs to be input to the vector U. As for the information about the exhaust gas and the information about the additive agent shown in the items a2, a3, at least one kind may be input, or no kind may be input. For increasing the estimation accuracy for the NOx removal efficiency in the first model 121, it is preferable that a large number of parameters be input.

After the components of the vector U are input to the input layer, the products of the components ui of the vector U and weight constants Wij are summed in the intermediate layer (Expression 1). Thereafter, as shown by Expression 2, the resulting value and a characteristic value θj (bias) for each node of the intermediate layers pass through the sigmoid function, to be output. In the output layer, the products of input values Yj and weight constants Wjk are summed, and the sum of the resulting value and a characteristic value θk (bias) is evaluated and output (Expression 3). An output variable Z of the first model 121 is an estimated value of the NOx removal efficiency of the SCR catalyst 40 under conditions shown by the input variable (vector U). Here, n represents the number of the components of the input variable, and m represents the number of the nodes of the intermediate layer. The first model 121 is an example of the "first model".

$$X_j = \sum_{i=1}^{n} W_{ij} \times u_i \quad (1)$$

$$Y_j = \frac{2}{1 + \exp(-2(X_j - \theta_j))} - 1 \quad (2)$$

$$Z = \sum_{j=1}^{m} W_{jk} \times Y_j + \theta_k \quad (3)$$

In the first model 121, the relation between the input variable and the output variable is learned by the NN, and the values Wij, θj, Wjk, θk in the NN are previously determined, such that the output variable Z coincides with a physical quantity (the NOx removal efficiency in the case of the first model 121) as an estimated object. In the learning of the first model 121, it is preferable to use data acquired at the time of transient operation of the internal combustion engine 92, as training data. The number of the nodes of the intermediate layer can be determined, for example, in consideration of the accuracy of the training data and the accuracy of data not used as the training data.

The second model 122 is a model for estimating the outflow amount of NH3 that flows out of the SCR catalyst 40, and is configured by a machine learning model, specifically, a NN. The second model 122 has the same configuration as the first model 121 described in FIG. 2, except later-described points.

A vector U that is an input variable of the second model 122 is configured by n components (u1, u2, . . . , un; n is a natural number). As the components of the vector U, parameters shown in the following items b1 to b3 can be employed. (b1) Information about Catalyst: at least one of the temperature of the front end of the SCR catalyst 40, the temperature of the SCR catalyst 40, the adsorption amount (actual adsorption amount) of NH3 that is adsorbed in the SCR catalyst 40 at the last time, the time derivative value of the temperature of the SCR catalyst 40, and the ratio of the adsorption amount (actual adsorption amount) to the saturated adsorption amount of NH3 in the SCR catalyst 40. (b2) Information about Exhaust Gas: at least one of the temperature of the exhaust gas from the internal combustion engine 92, the flow rate of the exhaust gas and the amount of NOx that is contained in the exhaust gas. (b3) Information about Additive Agent: the inflow amount of NH3 that flows into the SCR catalyst 40.

Similarly to the first model 121, as for the information about the catalyst shown in the item b1, at least one kind needs to be input to the vector U of the second model 122. As for the information about the exhaust gas and the information about the additive agent shown in the items b2, b3, at least one kind may be input, or no kind may be input.

For increasing the estimation accuracy for the outflow amount in the second model 122, it is preferable that a large number of parameters be input.

An output variable Z of the second model 122 is an estimated value of the outflow amount of NH3 that flows and disappears out of the SCR catalyst 40 under conditions shown by the input variable (vector U). The second model 122 is an example of the "second model".

Figure 3:
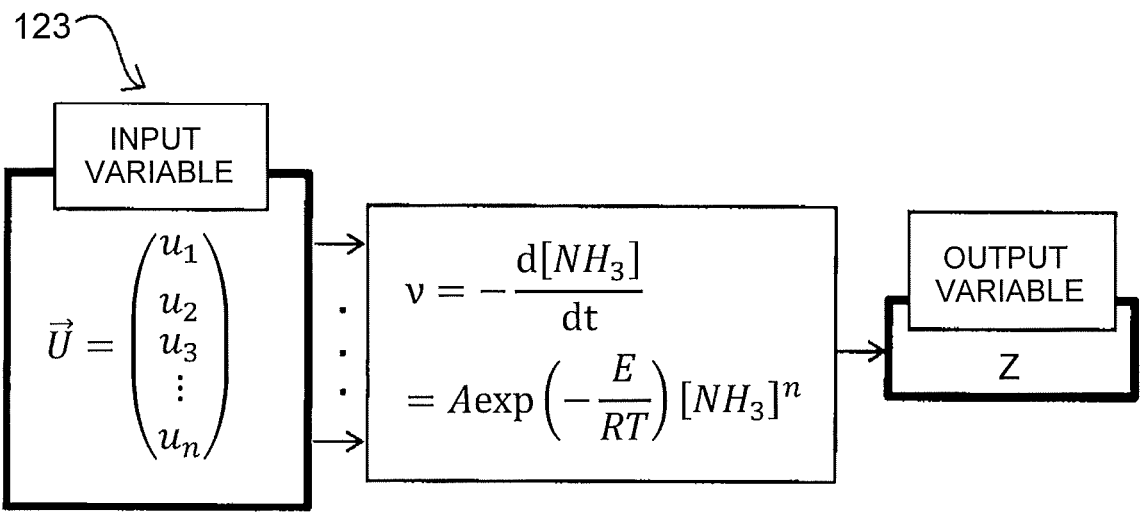
FIG. 3 is a diagram for describing a third model.

FIG. 3 is a diagram for describing the third model 123. The third model 123 is a model for estimating the amount of the additive amount (NH3) that does not contributes to the removal reaction of NOx in the SCR catalyst 40, and is configured by a physical model. It is known that NH3 disappears by thermal decomposition or oxidation reaction, particularly, under a high-temperature environment, and does not contribute to the removal reaction of NOx in the SCR catalyst 40. The third model 123 estimates the amount of NH3 that decreases due to the thermal decomposition or the oxidation reaction, as the amount of the additive agent (NH3) that does not contribute to the removal reaction of NOx. As shown in FIG. 3, the third model 123 is configured by the Arrhenius equation. In the Arrhenius equation, values previously evaluated by experiments and the like can be used as a frequency factor (A) and an activation energy (E).

A vector U that is an input variable of the third model 123 is configured by n components (u1, u2, . . . , un; n is a natural number). As the components of the vector U, parameters shown in the following items c1 to c3 can be employed. (c1) Information about Catalyst: at least one of the temperature of the front end of the SCR catalyst 40 and the temperature of the SCR catalyst 40. (c2) Information about Exhaust Gas: the temperature of the exhaust gas from the internal combustion engine 92. (c3) Information about Additive Agent: the inflow amount of NH3 that flows into the SCR catalyst 40.

Similarly to the first model 121, as for the information about the catalyst shown in the item c1, at least one kind needs to be input to the vector U of the third model 123. As for the information about the exhaust gas and the information about the additive agent shown in the items c2, c3, at least one kind may be input, or no kind may be input. For increasing the estimation accuracy for the amount of NH3 that does not contribute to the removal reaction of NOx in the third model 123, it is preferable that a large number of parameters be input.

An output variable Z of the third model 123 is an estimated value of the amount of NH3 that does not contribute to the removal reaction of NOx in the SCR catalyst 40 under conditions shown by the input variable (vector U). The third model 123 is an example of the "third model".

Back to FIG. 1, the description will be continued. The flow rate acquisition unit 52 acquires the flow rate of the exhaust gas from the internal combustion engine 92. For example, the flow rate acquisition unit 52 may be realized by acquiring a measurement signal that is measured by a pitot tube flowmeter provided in the exhaust pipe 30. The flow rate acquisition unit 52 may estimate the flow rate of the exhaust gas from an intake air amount signal and a fuel injection amount signal for the internal combustion engine 92. The exhaust gas temperature acquisition unit 53 is a sensor that measures the temperature of the exhaust gas from the internal combustion engine 92. The NOx concentration acquisition unit 54 is a sensor that measures the concentration of NOx in the exhaust gas that flows into the SCR catalyst 40. Instead of the measurement with the sensor, the NOx concentration acquisition unit 54 may estimate the concentration of NOx in the exhaust gas, from the combustion state (lean, stoichiometric or rich) of the internal combustion engine 92. The front-end temperature acquisition unit 56 is a sensor that measures the temperature of a vicinity (front end) of an inlet of the SCR catalyst 40. The temperature acquisition unit 58 is a sensor that measures the bed temperature of the SCR catalyst 40.

The flow rate acquisition unit 52, the exhaust gas temperature acquisition unit 53 and the NOx concentration acquisition unit 54 are examples of the "second sensor" that acquires the information about the exhaust gas that flows into the SCR catalyst 40. The front-end temperature acquisition unit 56 and the temperature acquisition unit 58 are examples of the "first sensor" that acquires the information about the SCR catalyst 40.

Figure 4:
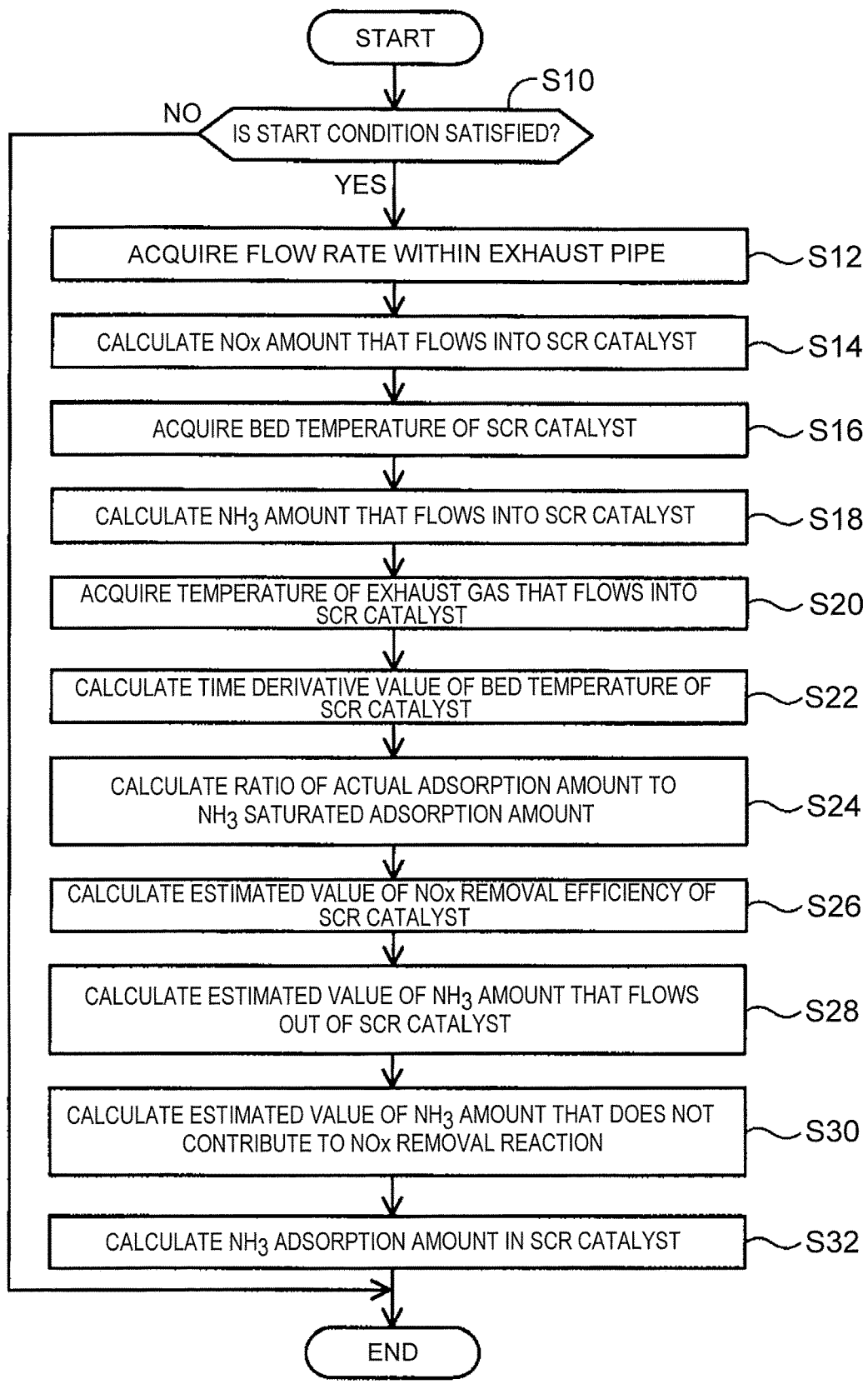
FIG. 4 is a flowchart showing a procedure of an estimation process in an estimation unit.

FIG. 4 is a flowchart showing a procedure of an estimation process in the estimation unit 110. The estimation process is a process for estimating the removal performance of the SCR catalyst 40, and is executed at an arbitrary timing. For example, the estimation process may be executed in response to a request from a user of the exhaust gas control system 1 or the catalyst state estimation apparatus 10, or may be executed in response to a request from another control unit in a vehicle on which the exhaust gas control system 1 is mounted. The estimation process shown in FIG. 4 is periodically executed.

Hereinafter, there will be shown an example in which all parameters of the items a1 to a3 are employed as the input of the above-described first model 121 except the temperature of the front end of the SCR catalyst 40, in which all parameters described in the items b1 to b3 are employed as the input of the second model 122 and in which all parameters described in the items c1 to c3 are employed as the input of the third model 123. Further, hereinafter, Δt represents a unit time (for example, an operation period of the CPU 11 or a sampling period in the above-described acquisition units 52 to 58) in the catalyst state estimation apparatus 10. Time t=kΔt means the current time, time t=(k+1)Δt means the next time (after one unit time), and time t=(k−1)Δt means the last time (before one unit time). Further, k is an integer.

In step S10, the estimation unit 110 determines whether a start condition of the estimation process is satisfied. Specifically, the estimation unit 110 determines that the start condition of the estimation process is satisfied, for example, in the case where the temperature acquisition unit 58 is normal, where the urea pump unit 62 and the urea nozzle 64 are normal and where the NOx concentration acquisition unit 54 is in an active state. In the case where the start condition of the estimation process is satisfied (step S10: YES), the estimation unit 110 transfers the process to step S12. In the case where the start condition of the estimation process is not satisfied (step S10: NO), the estimation unit 110 ends the process.

In step S12, the estimation unit 110 acquires a flow rate Q[k] within the exhaust pipe 30 at the current time (time t=kΔt), from the flow rate acquisition unit 52. In step S14, the estimation unit 110 calculates a NOx amount NOx_SCRin that flows into the SCR catalyst 40 at the current time (time t=kΔt). Specifically, the estimation unit 110 acquires the current NOx concentration [k] in the exhaust gas that flows into the SCR catalyst 40, from the NOx concentration acquisition unit 54. Next, the estimation unit 110 calculates the NOx amount NOx_SCRin[k], from the acquired NOx concentration [k] in the exhaust gas and the flow rate Q[k] of the exhaust gas acquired in step S12.

In step S16, the estimation unit 110 acquires a bed temperature T[k] of the SCR catalyst 40 at the current time (time t=kΔt), from the temperature acquisition unit 58. In step S18, the estimation unit 110 calculates an inflow amount NH3_SCRin[k] of NH3 that flows into the SCR catalyst 40 at the current time (time t=kΔt), from the injection amount of the urea water that is injected from the urea nozzle 64, using a calculation expression, a map or the like that is previously prepared. In step S18, the estimation unit 110 functions also as the "third sensor" that acquires the information about the additive agent.

In step S20, the estimation unit 110 acquires a temperature T_SCRin[k] of the exhaust gas that flows into the SCR catalyst 40 at the current time (time t=kΔt), from the exhaust gas temperature acquisition unit 53. In step S20, as T_SCRin[k], the estimation unit 110 may acquire the temperature of the vicinity (front end) of the inlet of the SCR catalyst 40, instead of the temperature of the exhaust gas.

In step S22, the estimation unit 110 calculates a time derivative value DiffT[k] of the bed temperature T of the SCR catalyst 40 at the current time (time t=kΔt), based on the following Expression 4. In Expression 4, Δt represents the sampling period of the temperature acquisition unit 58, T[k] represents the bed temperature T of the SCR catalyst 40 at the current time acquired in step S16, and T[k−1] represents the bed temperature T of the SCR catalyst 40 at the last time acquired in step S16. In step S22, the estimation unit 110 functions also as the "first sensor" that acquires the information about the catalyst.

$$\text{Diff}T[k]=(T[k]-T[k-1])/\Delta t \qquad (4)$$

Figure 5:
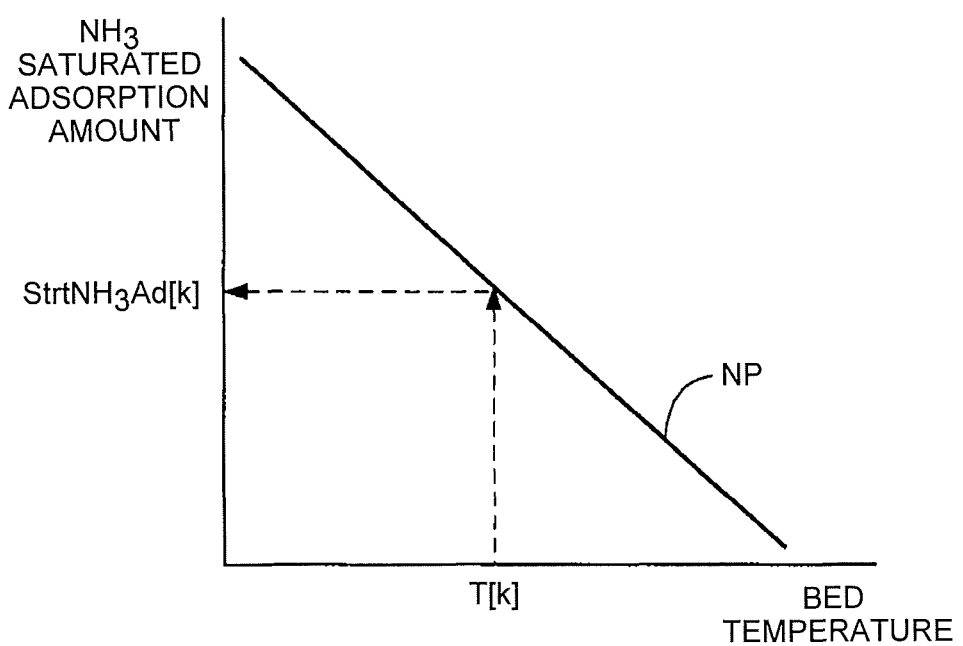
FIG. 5 is a diagram for describing step S24 of the estimation process.

FIG. 5 is a diagram for describing step S24 of the estimation process. In FIG. 5, the abscissa axis indicates the bed temperature of the SCR catalyst 40, and the ordinate axis indicates the saturated adsorption amount of NH3 in the SCR catalyst 40. As illustrated, the saturated adsorption amount of NH3 in the SCR catalyst 40 has a characteristic NP of decreasing as the bed temperature rises. A relational expression expressing the characteristic NP is previously evaluated by experiments or the like, and is stored in the storage unit 12.

In step S24 of FIG. 4, the estimation unit 110 calculates the ratio of the actual adsorption amount to the saturated adsorption amount of NH3 in the SCR catalyst 40. Specifically, the estimation unit 110 applies the bed temperature T[k] of the SCR catalyst 40 at the current time acquired in step S16, to the relational expression expressing the characteristic NP, and thereby, evaluates a saturated adsorption amount StrtNH3Ad[k] of NH3 in the SCR catalyst 40 at the current time (time t=kΔt) (FIG. 5). Next, the estimation unit 110 calculates a ratio r[k] of the actual adsorption amount to the saturated adsorption amount, using the evaluated saturated adsorption amount StrtNH3Ad[k] and an actual adsorption amount NH3Ad[k] of NH3 in the SCR catalyst 40 at the current time (time t=kΔt).

For the actual adsorption amount NH3Ad[k] of NH3 in the SCR catalyst 40 at the current time (time t=kΔt), the estimation unit 110 can use the estimated value obtained in the estimation process (FIG. 4) executed at the previous time, as the actual adsorption amount NH3Ad[k]. When there is no previous estimated value, for example, when the estimation process is executed for the first time, the estimation unit 110 can use a predetermined default value, as the actual adsorption amount NH3Ad[k]. The default value can be arbitrarily set. For example, zero or the saturated adsorption amount can be used. In step S22, the estimation unit 110 functions also as the "first sensor" that acquires the information about the catalyst.

In step S26, the estimation unit 110 calculates the estimated value of the NOx removal efficiency of the SCR catalyst 40. Specifically, the estimation unit 110 sets the values at the current time (time t=kΔt) evaluated in steps S12 to S20 described below, as the input variable vector U of the first model 121 (FIG. 2) for estimating the NOx removal efficiency, and evaluates the output variable Z. The estimation unit 110 adopts the output variable Z obtained from the first model 121, as a NOx removal efficiency NOxConv[k] of the SCR catalyst 40 at the current time (time t=kΔt). (a1) Information about Catalyst: the temperature (bed temperature) T[k] of the SCR catalyst 40 (step S16); and the adsorption amount (actual adsorption amount) $NH_3Ad[k]$ of NH3 that is adsorbed in the SCR catalyst 40 at the last time (the result of the previous estimation process). (a2) Information about Exhaust Gas: the temperature T_SCRin[k] of the exhaust gas from the internal combustion engine 92 (step S20); the flow rate Q[k] of the exhaust gas (step S12); and the amount NOx_SCRin[k] of NOx that is contained in the exhaust gas (step S14). (a3) Information about Additive Agent: the inflow amount NH3_SCRin[k] of NH3 that flows into the SCR catalyst 40 (step S18).

In this way, in step S26, the estimation unit 110 estimates the NOx removal efficiency NOxConv[k] as the removal performance of the SCR catalyst 40, using the first model 121. If there is a causal relation between the input and output variables (for example, the input variable vector U and the output variable Z), the machine learning model such as the first model 121 can obtain an output (estimation result) at a low computation load, even in a case where classification or regression requires a complex function approximation (for example, a case where a phenomenon that is difficult to be expressed by a physical formula is included, a case where a plurality of physical formulas is needed for describing a phenomenon, or a case where inputs to a physical formula increase on the assumption of influence of a large number of factors). In step S26, the estimation unit 110 estimates the NOx removal efficiency NOxConv[k], using the first model 121 configured by the machine learning model, and therefore, can estimate the removal efficiency for NOx that is influenced by a large number of factors, at a low computation load and a high speed. Further, by adopting a machine learning model after sufficient learning as the first model 121, the estimation unit 110 can estimate the removal efficiency for NOx at a high accuracy.

In step S28, the estimation unit 110 calculates the estimated value of the outflow amount of NH3 that flows out of the SCR catalyst 40. Specifically, the estimation unit 110 sets the values at the current time (time t=kΔt) evaluated in steps S12 to S24 described below, as the input variable vector U of the second model 122 for estimating the outflow amount of NH3, and evaluates the output variable Z. The estimation unit 110 adopts the output variable Z obtained from the second model 122, as an outflow amount NH3_SCRout[k] of NH3 that flows out of the SCR catalyst 40 at the current time (time t=kΔt). (b1) Information about Catalyst: the temperature (bed temperature) T[k] of the SCR catalyst 40 (step S16); the adsorption amount (actual adsorption amount) $NH_3Ad[k]$ of NH3 that is adsorbed in the SCR catalyst 40 at the last time (the result of the previous estimation process); the time derivative value DiffT[k] of the temperature of the SCR catalyst 40 (step S22); and the ratio r[k] of the adsorption amount (actual adsorption amount) to the saturated adsorption amount of NH3 in the SCR catalyst 40 (step S24). (b2) Information about Exhaust Gas: the temperature T_SCRin[k] of the exhaust gas from the internal combustion engine 92 (step S20); the flow rate Q[k] of the exhaust gas (step S12); and the amount NOx_SCRin[k] of NOx that is contained in the exhaust gas (step S14). (b3) Information about Additive Agent: the inflow amount NH3_SCRin[k] of NH3 that flows into the SCR catalyst 40 (step S18).

In this way, in step S28, the estimation unit 110 estimates the outflow amount NH3_SCRout[k] of NH3 as the removal performance of the SCR catalyst 40, using the second model 122. Similarly to the above-described first model 121, the second model 122 is configured by the machine learning model, and therefore, it is possible to estimate the outflow amount of NH3 that is influenced by a larger number of factors, at a low computation load and a high speed. Further, by adopting a machine learning model after sufficient learning as the second model 122, the estimation unit 110 can estimate the outflow amount at a high accuracy.

In step S30, the estimation unit 110 calculates the estimated value of the amount of the additive agent (NH3) that does not contribute to the removal reaction of NOx in the SCR catalyst 40. Specifically, the estimation unit 110 sets the values at the current time (time t=kΔt) evaluated in steps S16 to S20 described below, as the input variable vector U of the third model 123 for estimating the amount of NH3 that does not contribute to the removal reaction of NOx, and evaluates the output variable Z. The estimation unit 110 adopts the output variable Z obtained from the third model 123, as an amount HN3_thrmlytc[k] of NH3 that does not contribute to the removal reaction of NOx at the current time (time t=kΔt). (c1) Information about Catalyst: the temperature (bed temperature) T[k] of the SCR catalyst 40 (step S16). (c2) Information about Exhaust Gas: the temperature T_SCRin[k] of the exhaust gas from the internal combustion engine 92 (step S20). (c3) Information about Additive Agent: the inflow amount NH3_SCRin[k] of NH3 that flows into the SCR catalyst 40 (step S18).

In this way, in step S30, the estimation unit 110 estimates the amount NH3_thrmlytc[k] of NH3 that does not contribute to the removal reaction of NOx, as the removal performance of the SCR catalyst 40, using the third model 123. The physical model such as the third model 123 is a law that holds by similitude based on an actual physical law. Therefore, the output (estimation result) to be obtained by the third model 123 (physical model) satisfies the physical law. On the other hand, each of the first model 121 and second model 122 (machine learning models) is a model that is constructed as a result of learning of enormous data, and therefore, the output (estimation result) satisfying the physical law is not obtained in some cases. In step S30, the estimation unit 110 estimates the amount of NH3 (additive agent) that does not contribute to the removal reaction of NOx in the SCR catalyst 40, using the third model 123 configured by the physical model, and therefore, it is possible to estimate the amount of NH3 that is influenced by a small number of factors, at a high accuracy, in accordance with the physical law.

In step S32, the estimation unit 110 calculates the estimated value of the adsorption amount of NH3 that is adsorbed in the SCR catalyst 40 at the next time (time t=(k+1)Δt), based on the following Expression 5. Expression 5 functions as the "catalyst state estimation model 120".

$$NH_3Ad[k+1]=NH_3Ad[k]+(NH_3\_SCR_{in}[k]-NH_3\_SCR_{out}[k])-(NOxConv[k]/100) \times NOx\_SCR_{in}[k]-NH_3\_thrmlytc[k] \qquad (5)$$

Each value in Expression 5 is the removal performance (state) of the SCR catalyst 40 at the current time (time t=kΔt) that is estimated or calculated by the estimation unit 110 in steps S12 to S30. Specifically, NOxConv[k] is the NOx removal efficiency of the SCR catalyst 40 that is estimated by the first model 121. NH3_SCRout[k] is the outflow amount of NH3 that flows out of the SCR catalyst 40 and that is estimated by the second model 122. NH3thrmlytc[k] is the amount of NH3 that does not contribute to the removal reaction of NOx and that is estimated by the third model 123. NH3Ad[k] is the adsorption amount (actual adsorption amount) of NH3 that is adsorbed in the SCR catalyst 40, and is obtained as a result of the previous estimation process. NH3_SCRin[k] is the inflow amount of NH3 that flows into the SCR catalyst 40. NOx_SCRin[k] is the amount of NOx contained in the exhaust gas that flows into the SCR catalyst 40.

After the step S32 finishes, the estimation unit 110 outputs the adsorption amount NH3Ad[k+1] of NH3 that is estimated in step S32. The output can be performed in an arbitrary form. For example, the output may be displayed on an unillustrated display unit included in the catalyst state estimation apparatus 10, may be recorded in an estimation history within the storage unit 12, or may be sent as a signal to another control unit in the vehicle on which the exhaust gas control system 1 is mounted. The estimation unit 110 may output the result acquired, calculated or estimated in at least one of steps S12 to S30, in addition to the adsorption amount NH3Ad[k+1] of NH3 estimated in step S32 or instead of the adsorption amount NH3Ad[k+1] of NH3. Thereafter, the estimation unit 110 ends the process.

As described above, in the catalyst state estimation apparatus 10 according to the first embodiment, the estimation unit 110 estimates the adsorption amount NH3Ad[k+1] of NH3 (additive agent) that is adsorbed in the SCR catalyst 40, using the catalyst state estimation model 120. As is obvious from Expression 5, the catalyst state estimation model 120 concurrently uses the estimation results (the NOx removal efficiency and the outflow amount of NH3 that flows out of the SCR catalyst 40) of the first model 121 and the second model 122, each of which is a machine learning model (NN model), and the estimation result (the amount of NH3 that does not contribute to the removal reaction of NOx in the SCR catalyst 40) of the third model 123, which is a physical model, and estimates the adsorption amount NH3Ad[k+1] of NH3 (additive agent) that is adsorbed in the SCR catalyst 40 at the next time (time t=(k+1)Δt), using the physical law. Therefore, with the embodiment, the estimation unit 110 can estimate the adsorption amount NH3Ad[k+1] that is influenced by a large number of factors (for example, the factors shown in the items a1 to a3, b1 to b3, c1 to c3), at a high accuracy and a high speed, with the satisfaction of the physical law.

Further, the adsorption amount of NH3 (additive agent) that is adsorbed in the SCR catalyst 40 varies by influence of the adsorption amount NH3Ad[k] at the previous time (time t=kΔt) (in other words, by influence of a time history). The estimation unit 110 in the first embodiment estimates the adsorption amount NH3Ad[k+1] at the next time (time t=(k+1)Δt), using the current estimation results NOxConv[k], NH3_SCRout[k] and NH3_thrmlytc[k] of the first model 121, the second model 122 and the third model 123. Therefore, the estimation unit 110 can estimate the removal performance of the SCR catalyst 40 at the next time, at a high accuracy, in light of the removal performance of the SCR catalyst 40 at the previous time (time t=kΔt).

Furthermore, the removal performance of the SCR catalyst 40 varies by influence of the information about the catalyst (for example, the temperature of the SCR catalyst 40 and the amount of NH3 that is adsorbed in the SCR catalyst 40). In the catalyst state estimation apparatus 10 according to the first embodiment, the estimation unit 110 applies the information about the catalyst that influences the removal performance of the SCR catalyst 40, to the catalyst state estimation model 120, by adopting the information about the catalyst as parameters of the vectors U that are the input variables of the first model 121 (the item a1), the second model 122 (the item b1) and the third model 123 (the item a3). As a result, the estimation unit 110 can accurately estimate the removal performance of the SCR catalyst 40, and can increase the accuracy of the estimation in the technology of estimating the removal performance of the SCR catalyst 40 that purges the exhaust gas of the internal combustion engine 92.

Furthermore, in addition to the information about the catalyst, the removal performance of the SCR catalyst 40 varies by influence of the information about the exhaust gas that flows into the catalyst (for example, the temperature of the exhaust gas, the flow rate of the exhaust gas and the amount of NOx in the exhaust gas). In the catalyst state estimation apparatus 10 according to the first embodiment, the estimation unit 110 applies both of the information (the items a1, b1, c1) about the catalyst and the information (the items a2, b2, c2) about the exhaust gas that flows into the catalyst, each of which is information to influence the removal performance of the SCR catalyst 40, to the catalyst state estimation model 120, and thereby, can further accurately estimate the removal performance of the SCR catalyst 40. Further, the estimation unit 110 estimates the removal performance of the SCR catalyst 40 by further applying the information about the additive agent (for example, the amount of NH3 and the items a3, b3, c3) to the catalyst state estimation model 120 in addition to the information about the catalyst (the items a1, b1, c1). Therefore, it is possible to further increase the accuracy of the estimation, for example, in the case of estimating the removal performance of the catalyst that removes the toxic substance using the additive agent, as exemplified by the SCR catalyst 40 shown in the embodiment and another storage reduction catalyst (NSR catalyst: NOx Storage Reduction catalyst).

Furthermore, by using the data acquired at the time of the transient operation of the internal combustion engine 92 as the training data for generating the first model 121 and the second model 122, the estimation unit 110 can estimate the removal performance of the SCR catalyst 40 at the time of the transient operation of the internal combustion engine 92, in addition to the removal performance of the SCR catalyst 40 at the time of the normal operation of the internal combustion engine 92.

Figure 6:
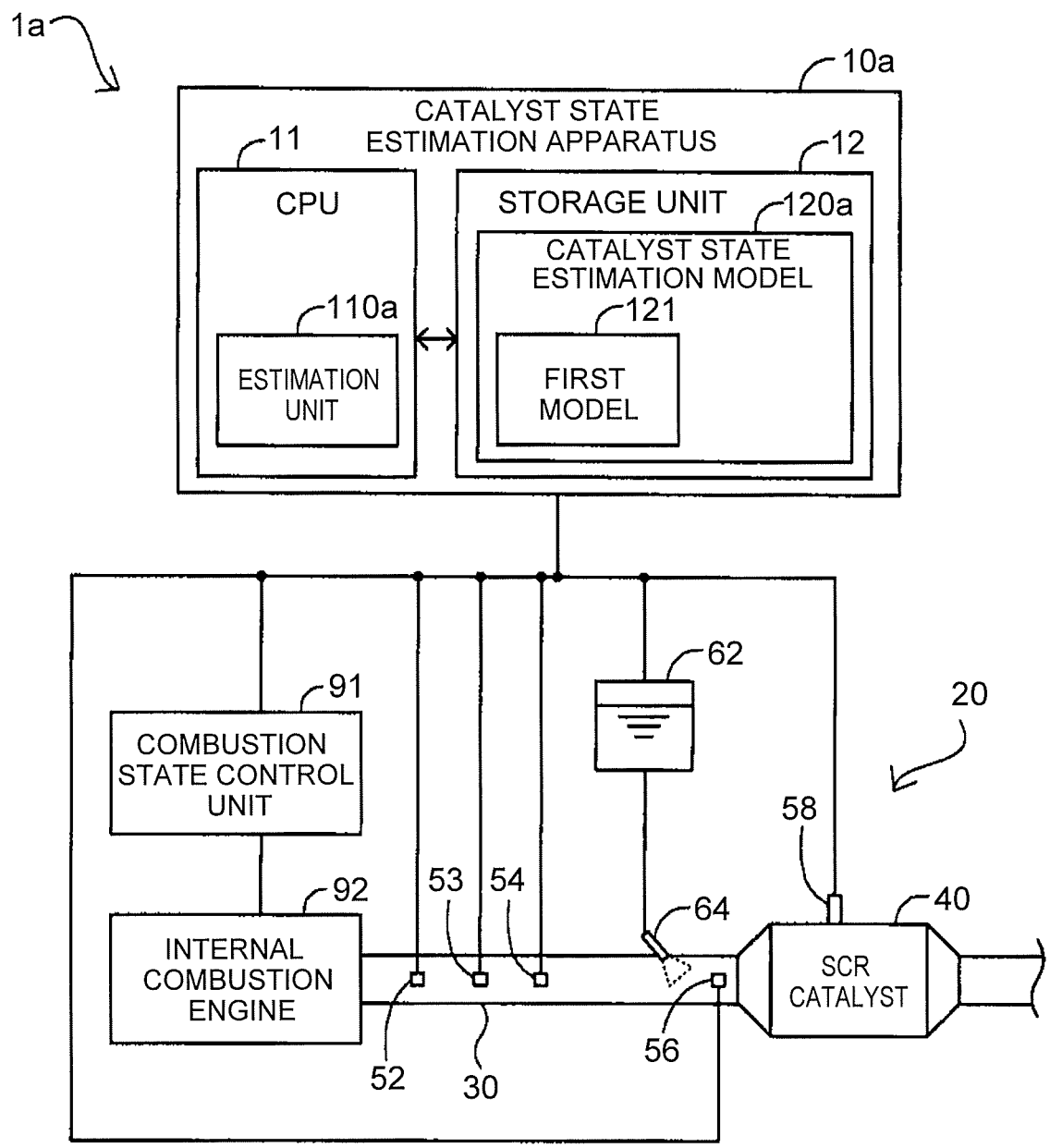
FIG. 6 is a block diagram of an exhaust gas control system in a second embodiment.

FIG. 6 is a block diagram of an exhaust gas control system 1a in a second embodiment. In the first embodiment shown in FIG. 1, as the removal performance of the SCR catalyst 40, the estimation unit 110 estimates the adsorption amount of NH3 that is adsorbed in the SCR catalyst 40 at the next time (time t=(k+1)Δt), using the estimation results of the first to third models 121 to 123. In the second embodiment, as the removal performance of the SCR catalyst 40, an estimation unit 110a estimates the NOx removal efficiency NOxConv[k] of the SCR catalyst 40 at the current time (time t=kΔt), using the first model 121.

In the storage unit 12 in the second embodiment, a catalyst state estimation model 120a including only the first model 121 described in FIG. 2 is previously stored. Using the first model 121 of the catalyst state estimation model 120a, the estimation unit 110a executes steps S10 to S24 and step S26 of the estimation process described in FIG. 4. After the execution of step S26, the estimation unit 110a outputs the NOx removal efficiency NOxConv[k] of the SCR catalyst 40 estimated in step S26, as the removal performance of the SCR catalyst 40. In this way, the second embodiment can exert the same effect as the first embodiment.

The exhaust gas control system 1a may include the second model 122, instead of the first model 121 or in addition to the first model 121. In this case, the estimation unit 110a executes step S28, instead of step S26 or in addition to step S26, and outputs the estimation result as the removal performance of the SCR catalyst 40. Further, the exhaust gas control system 1a may include the third model 123, instead of the first model 121 or in addition to the first model 121. In this case, the estimation unit 110a executes step S30, instead of step S26 or in addition to step S26, and outputs the estimation result as the removal performance of the SCR catalyst 40. Further, the exhaust gas control system 1a may include the first model 121, the second model 122 and the third model 123, without including the above-described Expression 5. In this case, the estimation unit 110a executes steps S26 to S30, and outputs the estimation result as the removal performance of the SCR catalyst 40. Even in this way, it is possible to exert the same effect as the first embodiment.

Figure 7:
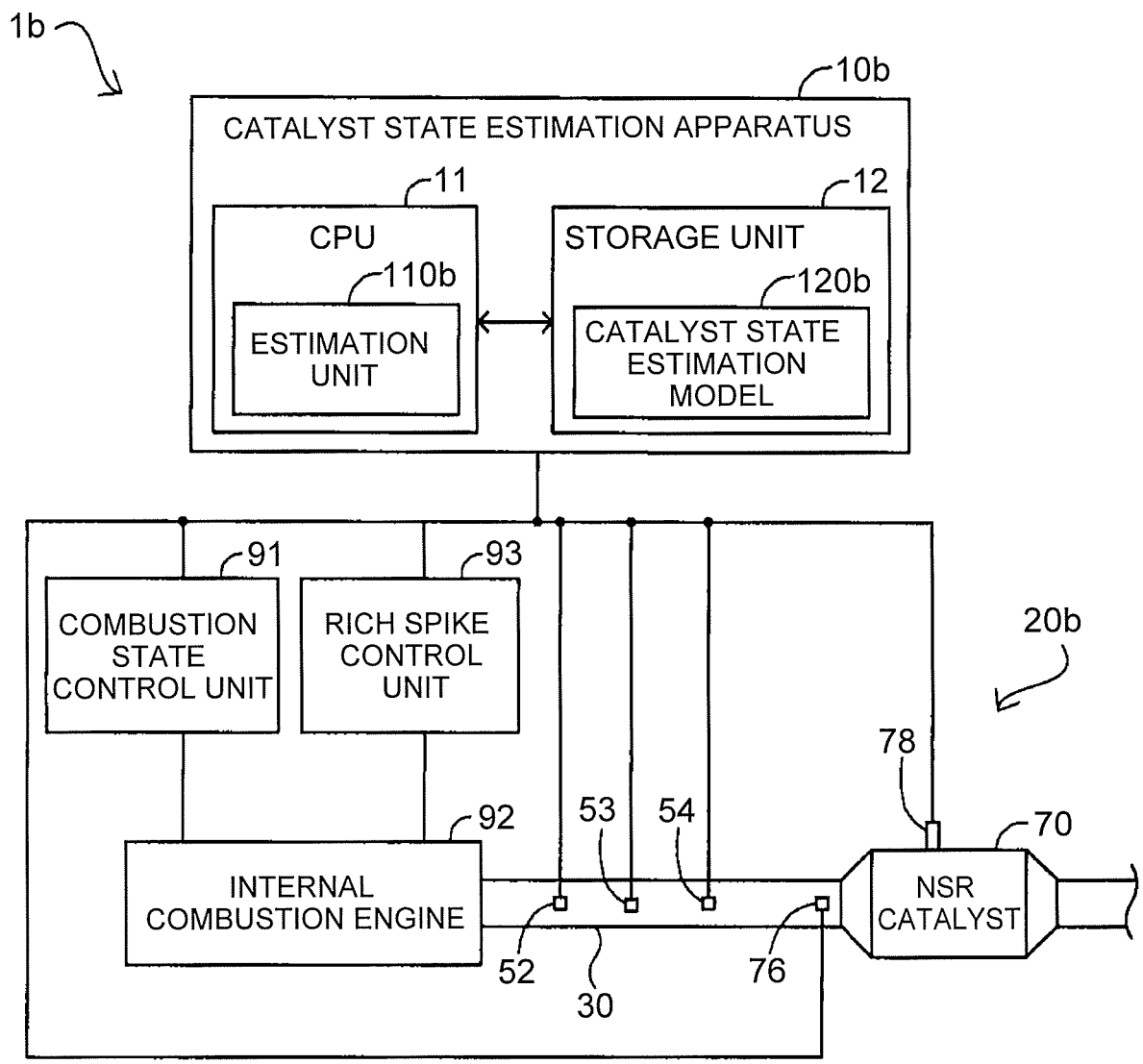
FIG. 7 is a block diagram of an exhaust gas control system in a third embodiment.

FIG. 7 is a block diagram of an exhaust gas control system 1b in a third embodiment. In the first embodiment shown in FIG. 1, the removal performance of the SCR catalyst is estimated. In the third embodiment, the exhaust gas control system 1b includes a storage reduction catalyst (NSR catalyst) instead of the SCR catalyst, and estimates the removal performance of the NSR catalyst.

The exhaust gas control system 1b further includes a rich spike control unit 93, includes a catalyst state estimation apparatus 10b instead of the catalyst state estimation apparatus 10, and includes an exhaust gas control apparatus 20b instead of the exhaust gas control apparatus 20. The rich spike control unit 93 is a control unit that generates a rich spike (a fuel rich combustion for a very short time) by controlling the injection of air and fuel to the internal combustion engine 92, and is implemented in an ECU, for example. By generating the rich spike, the rich spike control unit 93 reduces and eliminates NOx stored in a NSR catalyst 70, using carbon monoxide (CO), hydrogen (H2) and hydrocarbon (HC) supplied from the internal combustion engine 92 as reductants.

The exhaust gas control apparatus 20b includes the NSR catalyst 70 instead of the SCR catalyst 40, and does not include the urea pump unit 62 and the urea nozzle 64. The NSR catalyst 70 removes NOx in the exhaust gas, by accumulating (storing) NOx contained in the exhaust gas in a storage substance. The NSR catalyst 70 is an example of the "catalyst".

The catalyst state estimation apparatus 10b includes a front-end temperature acquisition unit 76 instead of the front-end temperature acquisition unit 56, includes a temperature acquisition unit 78 instead of the temperature acquisition unit 58, includes an estimation unit 110b instead of the estimation unit 110, and includes a catalyst state estimation model 120b instead of the catalyst state estimation model 120. The front-end temperature acquisition unit 76 is a sensor that measures the temperature of a vicinity (front end) of an inlet of the NSR catalyst 70. The temperature acquisition unit 78 is a sensor that measures the bed temperature of the NSR catalyst 70. The front-end temperature acquisition unit 76 and the temperature acquisition unit 78 are examples of the "first sensor" that acquires the information about the NSR catalyst 70.

Similarly to the catalyst state estimation model 120 in the first embodiment, the catalyst state estimation model 120b includes a first model that is configured by a machine learning model and that outputs the removal efficiency for NOx in the NSR catalyst 70, a second model that is configured by a machine learning model and that outputs the outflow amount of CO, H2 and HC from the NSR catalyst 70, and a third model that is configured by a physical model and that outputs the amount of CO, H2 and HC that do not contribute to the removal reaction of NOx. The estimation unit 110b executes the estimation process in FIG. 2, using the catalyst state estimation model 120b, and evaluates the storage amount of NOx in the NSR catalyst 70, using a physical law (for example, the law of conversion of mass, the law of material balance, the law of heat balance and the law of energy balance). Similarly to the adsorption amount of NH3 in the first embodiment, the storage amount of NOx in the NSR catalyst 70 varies by influence of the storage amount at the previous time (in other words, by influence of a time history).

Thereby, in the third embodiment using the NSR catalyst 70, it is possible to exert the same effect as the first embodiment.

Figure 8:
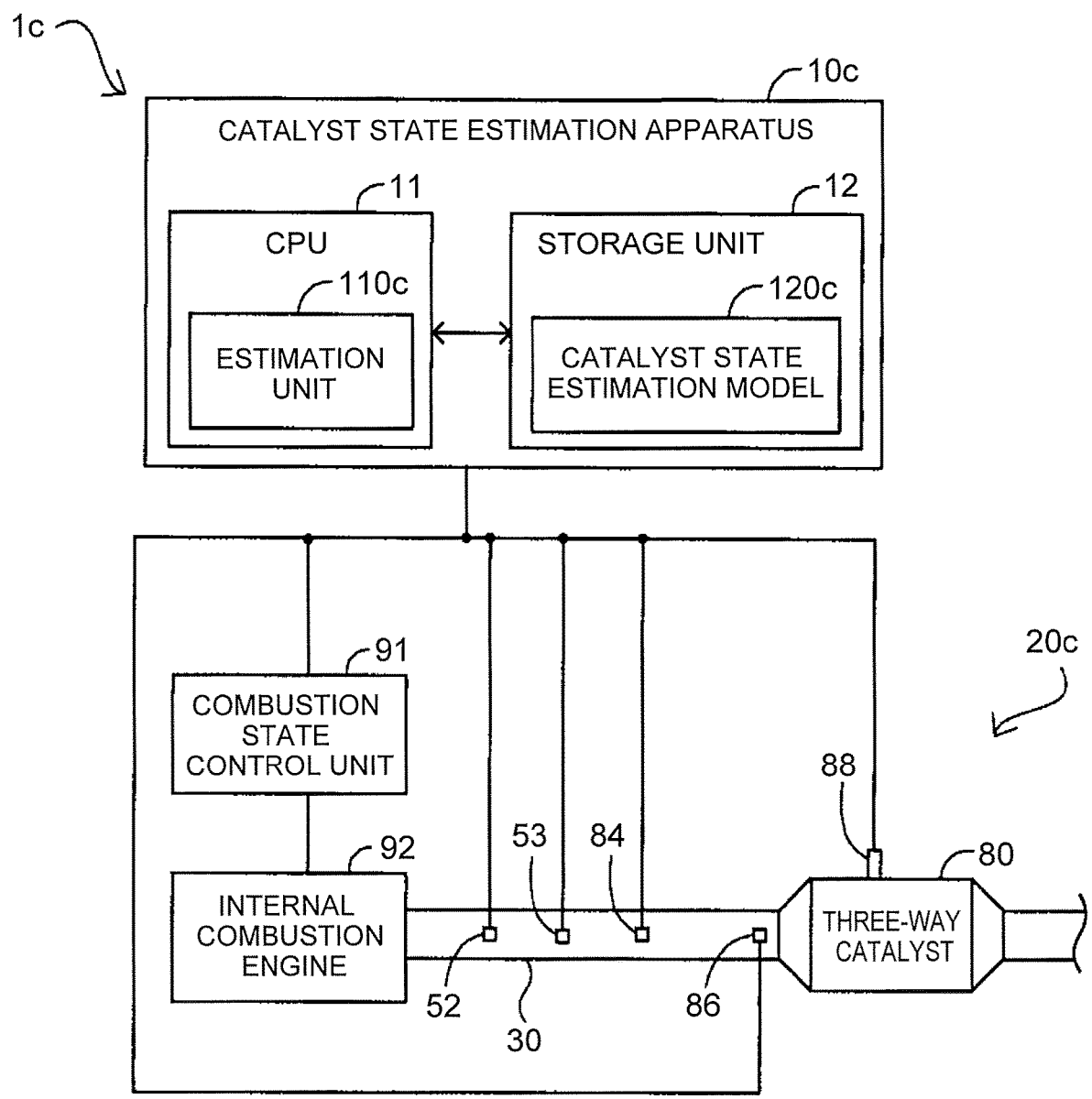
FIG. 8 is a block diagram of an exhaust gas control system in a fourth embodiment.

FIG. 8 is a block diagram of an exhaust gas control system 1c in a fourth embodiment. In the first embodiment shown in FIG. 1, the removal performance of the SCR catalyst is estimated. In the fourth embodiment, the exhaust gas control system Ic includes a three-way catalyst instead of the SCR catalyst, and estimates the removal performance of the three-way catalyst.

The exhaust gas control system 1c includes a catalyst state estimation apparatus 10c instead of the catalyst state estimation apparatus 10, and includes an exhaust gas control apparatus 20c instead of the exhaust gas control apparatus 20. The exhaust gas control apparatus 20c includes a three-way catalyst 80 instead of the SCR catalyst 40, and does not include the urea pump unit 62 and the urea nozzle 64. The three-way catalyst 80 eliminates each of CO, HC and NOx contained in the exhaust gas, by oxidation or reduction, and removes these toxic substances. The three-way catalyst 80 in the embodiment has oxygen storage capacity (OSC), and can accumulate (store) oxygen (02) in the exhaust gas that flows into the three-way catalyst 80.

The catalyst state estimation apparatus 10c includes an oxygen concentration acquisition unit 84 instead of the NOx concentration acquisition unit 54, includes a front-end temperature acquisition unit 86 instead of the front-end temperature acquisition unit 56, includes a temperature acquisition unit 88 instead of the temperature acquisition unit 58, includes an estimation unit 110c instead of the estimation unit 110, and includes a catalyst state estimation model 120c instead of the catalyst state estimation model 120. The oxygen concentration acquisition unit 84 acquires the 02 concentration in the exhaust gas from the internal combustion engine 92. For example, the oxygen concentration acquisition unit 84 may be realized by acquiring a measurement signal that is measured by an A/F sensor provided in the exhaust pipe 30, or may be realized by acquiring a measurement signal that is measured by an oxygen sensor. The oxygen concentration acquisition unit 84 may estimate the 02 concentration in the exhaust gas, from the intake air amount signal or the fuel injection amount signal for the internal combustion engine 92. The oxygen concentration acquisition unit 84 functions also as the "third sensor" that acquires the information about the additive agent. The front-end temperature acquisition unit 86 is a sensor that measures the temperature of a vicinity (front end) of an inlet of the three-way catalyst 80. The temperature acquisition unit 88 is a sensor that measures the bed temperature of the three-way catalyst 80. The front-end temperature acquisition unit 86 and the temperature acquisition unit 88 are examples of the "first sensor" that acquires the information about the three-way catalyst 80.

Similarly to the catalyst state estimation model 120 in the first embodiment, the catalyst state estimation model 120c includes a first model that is configured by a machine learning model and that outputs the removal efficiency for at least one of CO, HC and NOx in the three-way catalyst 80, a second model that is configured by a machine learning model and that outputs the outflow amount of O2 from the three-way catalyst 80, and a third model that is configured by a physical model and that outputs the amount of O2 that does not contribute to the removal reaction of CO, HC and NOx. The estimation unit 110c executes the estimation process in FIG. 2, using the catalyst state estimation model 120c, and evaluates the storage amount of O2 in the three-way catalyst 80, using a physical law (for example, the law of conversion of mass, the law of material balance, the law of heat balance and the law of energy balance). Similarly to the adsorption amount of NH3 in the first embodiment, the storage amount of O2 in the three-way catalyst 80 varies by influence of the storage amount at the previous time (in other words, by influence of a time history).

Thereby, in the fourth embodiment using the three-way catalyst 80, it is possible to exert the same effect as the first embodiment.

Figure 9:
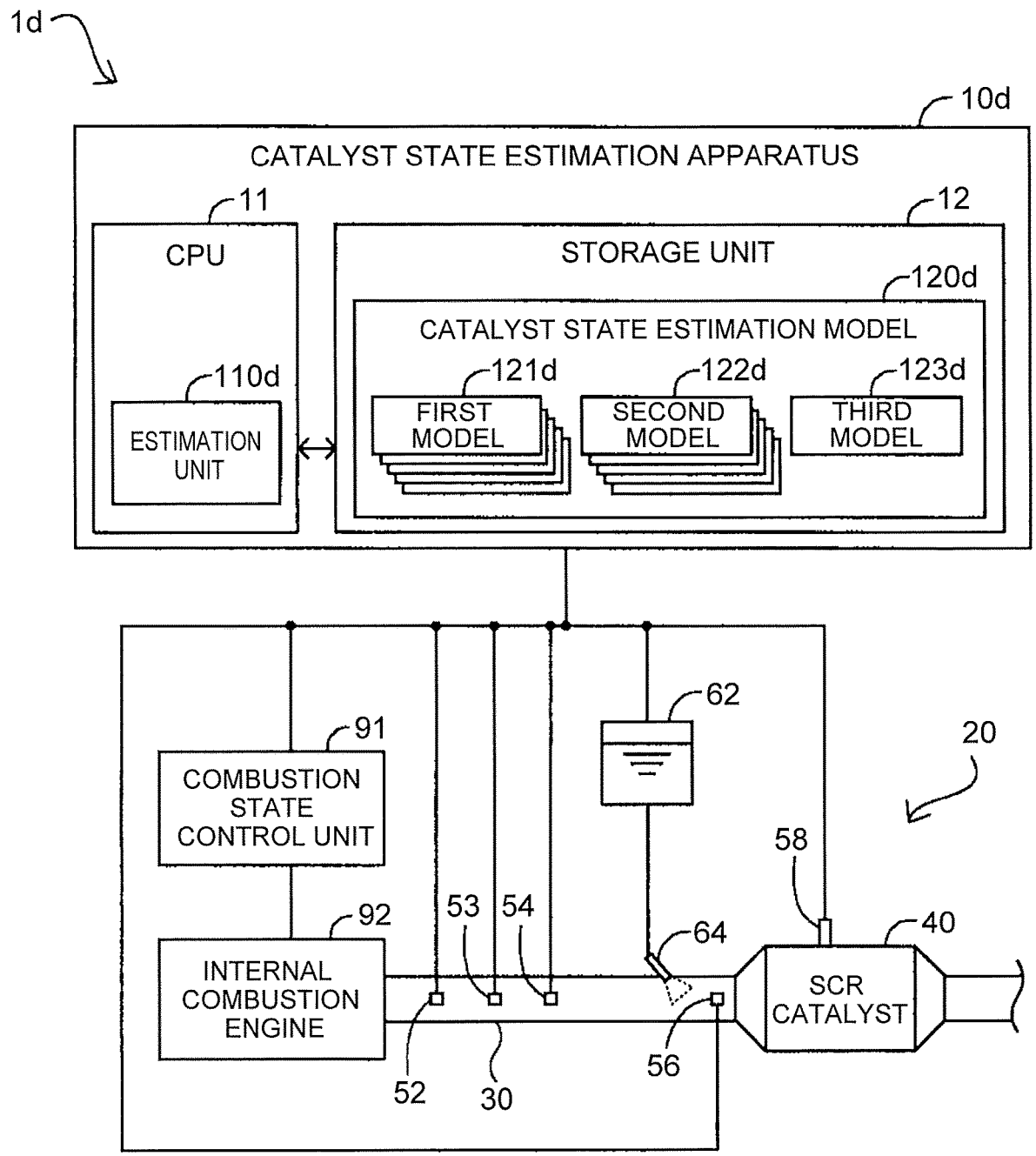
FIG. 9 is a block diagram of an exhaust gas control system in a fifth embodiment.

FIG. 9 is a block diagram of an exhaust gas control system id in a fifth embodiment. In the first embodiment shown in FIG. 1, the removal efficiency of the SCR catalyst 40 is estimated using the single first model 121 and the single second model 122. In the fifth embodiment, the exhaust gas control system id selectively uses a plurality of first models 121d and a plurality of second models 122d, and estimates the removal performance of the SCR catalyst 40.

The exhaust gas control system id includes a catalyst state estimation apparatus 10d instead of the catalyst state estimation apparatus 10. The catalyst state estimation apparatus 10d includes an estimation unit 110d instead of the estimation unit 110, and includes a catalyst state estimation model 120d instead of the catalyst state estimation model 120. The catalyst state estimation model 120d includes the plurality of first models 121d, the plurality of second models 122d, and the third model 123. The respective first models 121d are created using training dada acquired from a plurality of SCR catalysts 40 having different deterioration degrees. Specifically, for example, a first model 121d(1) is created from training data acquired from a SCR catalyst 40 in which the degree of deterioration is low, a first model 121d(2) is created from training data acquired from a SCR catalyst 40 in which the degree of deterioration is a middle level, and a first model 121d(3) is created from training data acquired from a SCR catalyst 40 in which the degree of deterioration is high. The degree (deterioration degree) of deterioration may be determined from the state of the SCR catalyst 40, the replacement time of the SCR catalyst 40 or the like, may be determined from the NOx concentration in the exhaust gas that is discharged from the SCR catalyst 40, or may be determined from the mileage of the vehicle, or the like. Similarly to the first models 121d, the respective second models 122d are created using training data acquired from a plurality of SCR catalysts 40 having different deterioration degrees.

In step S26 of the estimation process (FIG. 2), the estimation unit 110d estimates the NOx removal efficiency of the SCR catalyst 40, using a first model 121d corresponding to the degree of the deterioration of the SCR catalyst 40. Further, in step S28, the estimation unit 110d estimates the outflow amount of NH3 that flows out of the SCR catalyst 40, using a second models 122d corresponding to the degree of the deterioration of the SCR catalyst 40.

Thereby, in the fifth embodiment, it is possible to exert the same effect as the first embodiment. Further, with the fifth embodiment, the catalyst state estimation model 120d includes the plurality of first models 121d and the plurality of second models 122d that are created using the training data acquired from the SCR catalysts 40 having different deterioration degrees, and therefore, it is possible to employ an optimal first model 121d and second model 122d depending on the deterioration degree of the SCR catalyst 40. As a result, with the fifth embodiment, it is possible to estimate the removal performance of the catalyst at a further higher accuracy.

Figure 10:
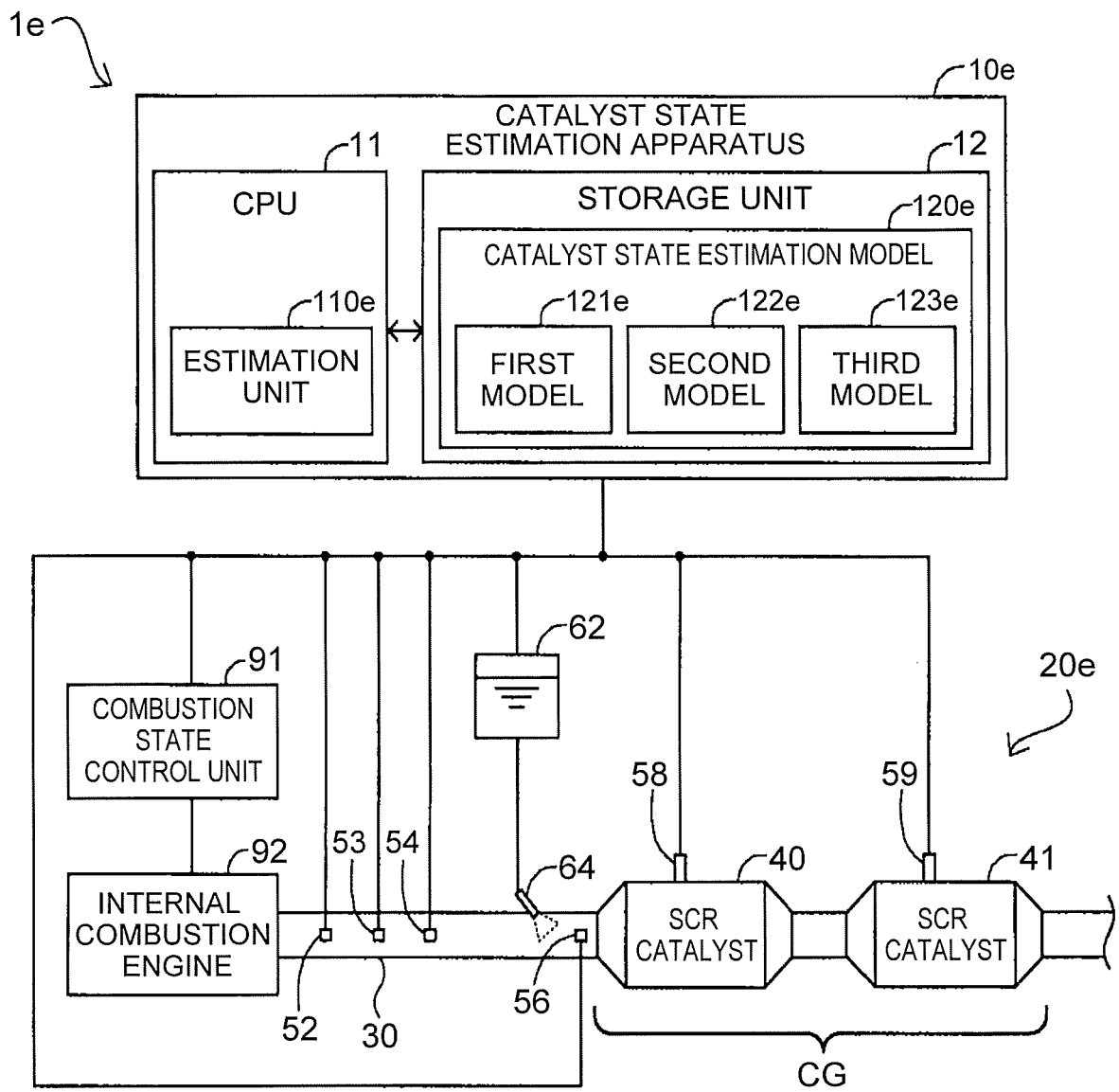
FIG. 10 is a block diagram of an exhaust gas control system in a sixth embodiment.

FIG. 10 is a block diagram of an exhaust gas control system 1e in a sixth embodiment. In the first embodiment shown in FIG. 1, the removal performance of the single SCR catalyst is estimated. In the sixth embodiment, the exhaust gas control system 1e is equipped with a plurality of SCR catalysts, and estimates the removal performance of the whole of the plurality of SCR catalysts. The exhaust gas control system 1e includes a catalyst state estimation apparatus 10e instead of the catalyst state estimation apparatus 10, and includes an exhaust gas control apparatus 20e instead of the exhaust gas control apparatus 20.

The exhaust gas control apparatus 20e further includes a second SCR catalyst 41 that is disposed on the downstream side of the SCR catalyst 40. Hereinafter, for distinction, the SCR catalyst 40 is referred to as a first SCR catalyst 40. The second SCR catalyst 41 is a selective catalytic reduction catalyst that is a type identical to the first SCR catalyst 40. In the embodiment, an "identical type of catalyst" means a catalyst having an equal or similar exhaust gas control mechanism. The second SCR catalyst 41 removes the toxic substance (NOx) discharged without being removed in the first SCR catalyst 40, with the additive agent (NH3) discharged without being used in the first SCR catalyst 40. The exhaust gas control apparatus 20e may be configured to include a urea nozzle for separately supplying the urea water from the urea pump unit 62 to the second SCR catalyst 41. Hereinafter, a plurality of identical-type catalysts (the first and second SCR catalysts 40, 41) mounted on the exhaust gas control apparatus 20e are collectively referred to as a "catalyst group CG" also. In the configuration shown in FIG. 10, the first SCR catalyst 40 is an example of the "catalyst positioned on a most upstream side", and the second SCR catalyst 41 is an example of the "catalyst positioned on a most downstream side".

The catalyst state estimation apparatus 10e further includes a second temperature acquisition unit 59 constituted by a sensor that measures the bed temperature of the second SCR catalyst 41. Further, the catalyst state estimation apparatus 10e includes an estimation unit 110e instead of the estimation unit 110, and includes a catalyst state estimation model 120e instead of the catalyst state estimation model 120. The estimation unit 110e is different from the estimation unit 110 in the first embodiment (FIG. 4), in the content of the estimation process. The catalyst state estimation model 120e includes a first model 121e, a second model 122e and a third model 123e.

The first model 121e is a model for estimating the total of the removal amounts of NOx in the plurality of identical-type catalysts (that is, the first and second SCR catalysts 40, 41) mounted on the exhaust gas control apparatus 20e. Similarly to the first embodiment, the first model 121e is configured by a machine learning model, specifically, a NN. As the components of a vector U that is an input variable of the first model 121e, parameters shown in the following items a11 to a13 can be employed. (a11) Information about Catalyst: at least one of the temperature of the front end of the first SCR catalyst 40 positioned on the most upstream side, the temperatures of the first and second SCR catalysts 40, 41, and the total of the adsorption amounts of NH3 that is adsorbed in the plurality of catalysts at the last time. (a12) Information about Exhaust Gas: at least one of the temperature of the exhaust gas that flows from the internal combustion engine 92 into the first SCR catalyst 40 positioned on the most upstream side, the flow rate of the exhaust gas, and the amount of NOx contained in the exhaust gas that flows into the first SCR catalyst 40 positioned on the most upstream side. (a13) Information about Additive Agent: the inflow amount of NH3 that flows into the first SCR catalyst 40 positioned on the most upstream side Similarly to the first embodiment, as for the information about the catalyst shown in the item a11, at least one kind needs to be input to the vector U. As for the information about the exhaust gas and the information about the additive agent shown in the items a12, a13, at least one kind may be input, or no kind may be input. The process after the components of the vector U are input to the input layer is the same as that in the first embodiment. An output variable Z of the first model 121e is an estimated value of the total of the removal amounts of NOx in the plurality of catalysts (that is, the first and second SCR catalysts 40, 41) under conditions shown by the input variable (vector U).

In the first model 121e, similarly to the first embodiment, the relation between the input variable and the output variable is learned by the NN, and the values Wij, θj, Wjk, Ok in the NN are previously determined, such that the output variable Z coincides with a physical quantity as an estimated object. In the embodiment, at the time of the learning, it is preferable to use training data acquired from the catalyst group constituted by the plurality of identical-type catalysts (the first and second SCR catalysts) disposed in a main passage (exhaust pipe) for an exemplar, while an inlet of the first SCR catalyst positioned on the most upstream side is regarded as an inlet of the catalyst group and an outlet of the second SCR catalyst positioned on the most downstream side is regarded as an outlet of the catalyst group.

The second model 122e is a model for estimating the outflow amount of NH3 that flows out of the plurality of catalysts, in other words, the outflow amount of NH3 that flows out of the second SCR catalyst 41 positioned on the most downstream side. Similarly to the first embodiment, the second model 122e is configured by a machine learning model, specifically, a NN. As the components of a vector U that is an input variable of the second model 122e, parameters shown in the following items b11 to b13 can be employed. (b11) Information about Catalyst: at least one of the temperature of the front end of the first SCR catalyst 40 positioned on the most upstream side, the temperatures of the first and second SCR catalysts 40, 41, the total (the total of the actual adsorption amounts) of the adsorption amounts of NH3 that is adsorbed in the plurality of catalysts at the last time, the time derivative value of the temperature of the first SCR catalyst 40, the time derivative value of the temperature of the second SCR catalyst 41, and the ratio of the total (the total of the actual adsorption amounts) of the adsorption amounts to the total of the saturated adsorption amounts of NH3 in the plurality of catalysts. (b12) Information about Exhaust Gas: at least one of the temperature of the exhaust gas that flows from the internal combustion engine 92 into the first SCR catalyst 40 positioned on the most upstream side, the flow rate of the exhaust gas, and the amount of NOx contained in the exhaust gas that flows into the first SCR catalyst 40 positioned on the most upstream side. (b13) Information about Additive Agent: the inflow amount of NH3 that flows into the first SCR catalyst 40 positioned on the most upstream side.

Similarly to the first embodiment, as for the information about the catalyst shown in the item b11, at least one kind needs to be input to the vector U. As the information about the exhaust gas and the information about the additive agent shown in the items b12, b13, at least one kind may be input, or no kind may be input. An output variable Z of the second model 122e is an estimated value of the outflow amount of NH3 that flows and disappears out of the plurality of catalysts, in other words, the outflow amount of NH3 that flows and disappears out of the second SCR catalyst 41 positioned on the most downstream side, under conditions shown by the input variable (vector U). In the second model 122e, similarly to the first model 121e, when the relation between the input variable and the output variable is learned by the NN, it is preferable to use training data acquired from the catalyst group constituted by the plurality of identical-type catalysts (the first and second SCR catalysts) disposed in the main passage (exhaust pipe) for the exemplar, while the inlet of the first SCR catalyst positioned on the most upstream side is regarded as the inlet of the catalyst group and the outlet of the second SCR catalyst positioned on the most downstream side is regarded as the outlet of the catalyst group.

The third model 123e is a model for estimating the amount of the additive agent (NH3) that is supplied to the first SCR catalyst 40 positioned on the most upstream side and that does not contribute to the removal reaction of NOx in the plurality of catalysts. Similarly to the first embodiment, the third model 123e is configured by a physical model, specifically, the Arrhenius equation. As the components of a vector U that is an input variable of the third model 123e, parameters shown in the following items c11 to c13 can be employed. (c11) Information about Catalyst: at least one of the temperature of the front end of the first SCR catalyst 40 positioned on the most upstream side and the temperatures of the first and second SCR catalysts 40, 41. (c12) Information about Exhaust Gas: the temperature of the exhaust gas that flows from the internal combustion engine 92 into the first SCR catalyst 40 positioned on the most upstream side. (c13) Information about Additive Agent: the inflow amount of NH3 that flows into the first SCR catalyst 40 positioned on the most upstream side.

Similarly to the first embodiment, as the information about the catalyst shown in the item c11, at least one kind needs to be input to the vector U. As for the information about the exhaust gas and the information about the additive agent shown in the items c12, c13, at least one kind may be input, or no kind may be input. An output variable Z of the third model 123e is an estimated value of the amount of NH3 that does not contribute to the removal reaction of NOx in the plurality of catalysts under conditions shown by the input variable (vector U).

Figure 11:
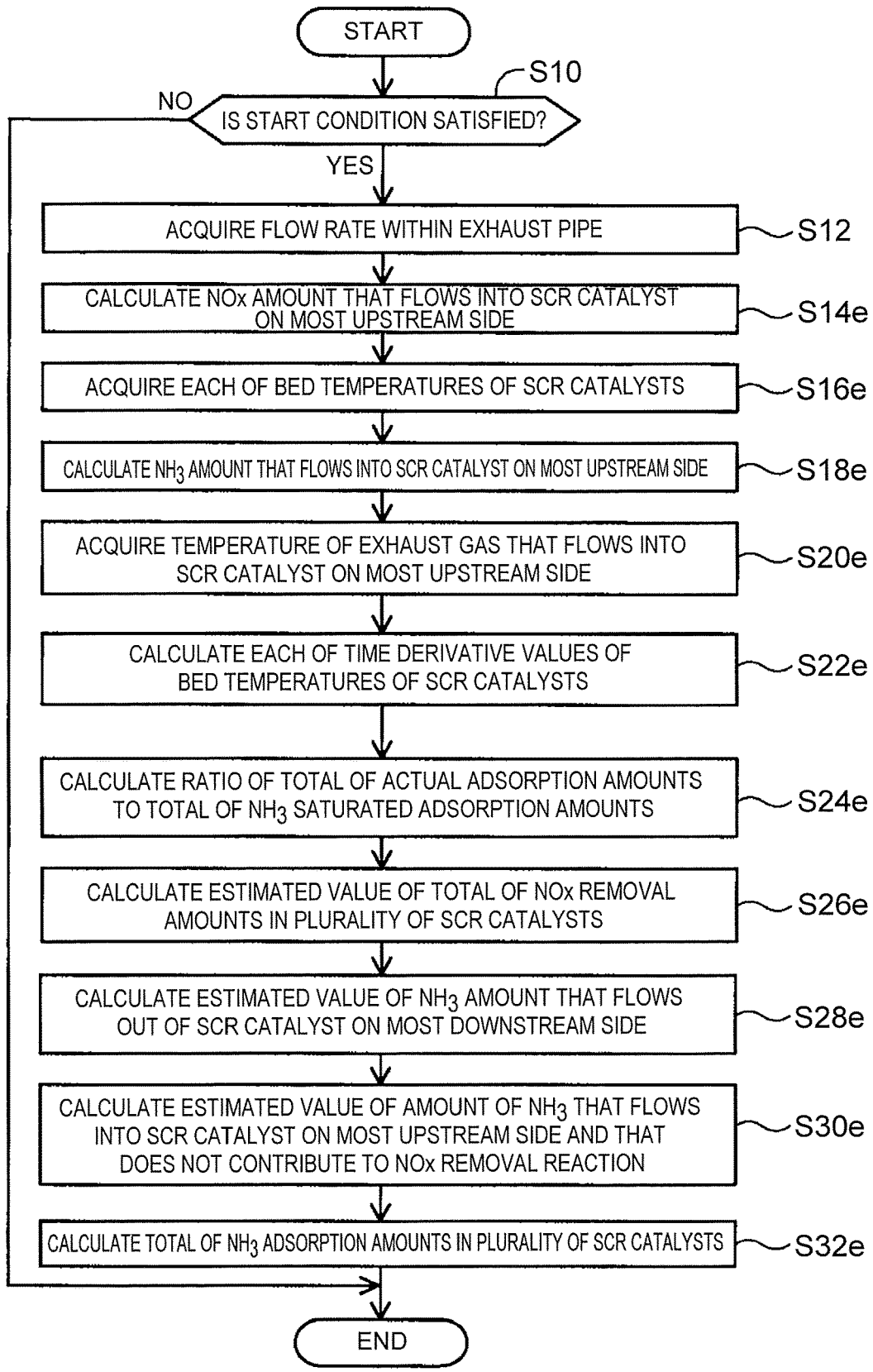
FIG. 11 is a flowchart showing a procedure of an estimation process in an estimation unit in the sixth embodiment.

FIG. 11 is a flowchart showing a procedure of an estimation process in the estimation unit 110e in the sixth embodiment. The estimation process in the sixth embodiment is a process for estimating the removal performance of the whole of the plurality of catalysts, and is executed at an arbitrary timing, similarly to the first embodiment shown in FIG. 4. In the following descriptions, definitions of the parameters in the items a11 to a13, items b11 to b13 and items c11 to c13, $\Delta t$, time $t=k\Delta t$, time $t=(k+1)\Delta t$, and time $t=(k-1)\Delta t$ are the same as those in the first embodiment. Further, only different processes from the first embodiment shown in FIG. 4 will be described below.

In step S14e, the estimation unit 110e calculates the NOx amount NOx_SCRin that flows into the first SCR catalyst 40 positioned on the most upstream side at the current time (time $t=k\Delta t$). In step S16e, the estimation unit 110e acquires a bed temperature T1[k] of the first SCR catalyst 40 at the current time (time $t=k\Delta t$), from the first temperature acquisition unit 58. Further, the estimation unit 110e acquires a bed temperature T2[k] of the second SCR catalyst 41 at the current time (time $t=k\Delta t$), from the second temperature acquisition unit 59. In step S18e, the estimation unit 110e calculates the inflow amount NH3_SCRin[k] of NH3 that flows into the first SCR catalyst 40 positioned on the most upstream side at the current time (time $t=k\Delta t$), from the injection amount of the urea water that is injected from the urea nozzle 64.

In step S20e, the estimation unit 110e acquires a temperature T1_SCRin[k] of the exhaust gas that flows into the first SCR catalyst 40 positioned on the most upstream side at the current time (time $t=k\Delta t$), from the exhaust gas temperature acquisition unit 53. In step S22e, the estimation unit 110e calculates each of time derivative values DiffTn[k] of bed temperatures Tn of the SCR catalysts (the first and second SCR catalysts 40, 41) at the current time (time $t=k\Delta t$), based on the following Expression 6. A variable n in Expression 6 is a natural number for distinguishing the catalysts.

$$\text{Diff}Tn[k]=(Tn[k]-Tn[k-1])/\Delta t \quad (6)$$

In step S24e, the estimation unit 110e calculates the ratio of the total of the actual adsorption amounts to the total of the saturated adsorption amounts of NH3 in the plurality of catalysts. Specifically, the estimation unit 110e applies the bed temperature T1[k] of the first SCR catalyst 40 at the current time acquired in step S16e, to the relational expression expressing the characteristic NP, and thereby, evaluates the saturated adsorption amount of NH3 in the first SCR catalyst 40 at the current time (time $t=k\Delta t$) (FIG. 5). Similarly, the estimation unit 110e applies the bed temperature T2[k] of the second SCR catalyst 41 at the current time acquired in step S16e, to the relational expression expressing the characteristic NP, and thereby, evaluates the saturated adsorption amount of NH3 in the second SCR catalyst 41 at the current time (time $t=k\Delta t$). The estimation unit 110e adopts the sum of the evaluated saturated adsorption amounts, as the total StrtNH3Ad[k] of the saturated adsorption amounts of NH3 in the plurality of catalysts. Next, the estimation unit 110e calculates the ratio r[k] of the total of the actual adsorption amounts to the total of the saturated adsorption amounts, using the total StrtNH3Ad[k] of the evaluated saturated adsorption amounts and the total NH3Ad[k] of the actual adsorption amounts of NH3 in the plurality of catalysts at the current time (time $t=k\Delta t$). For the total NH3Ad[k] of the actual adsorption amounts of NH3 in the plurality of catalysts, similarly to the first embodiment, the estimation value obtained in the estimation process executed at the previous time can be used, and for example, when there is no estimation value, a predetermined default value can be used.

In step S26e, the estimation unit 110e calculates the estimated value of the total of the removal amounts of NOx in the plurality of catalysts (that is, the first and second SCR catalysts 40, 41). Specifically, the estimation unit 110e sets the values at the current time (time $t=k\Delta t$) evaluated in steps S12, S14e to S20e, as the input variable vector U of the first model 121e, and evaluates the output variable Z. The estimation unit 110e adopts the output variable Z obtained from the first model 121e, as the total NOxConv[k] of the removal amounts of NOx in the plurality of catalysts at the current time (time $t=k\Delta t$).

In step S28e, the estimation unit 110e calculates the estimated value of the outflow amount of NH3 that flows and disappears out of the plurality of catalysts, in other words, the outflow amount of NH3 that flows and disappears out of the second SCR catalyst 41 positioned on the most upstream side. Specifically, the estimation unit 110e sets the values at the current time (time $t=k\Delta t$) evaluated in steps S12, S14e to S24e, as the input variable vector U of the second model 122e, and evaluates the output variable Z. The estimation unit 110e adopts the output variable Z obtained from the second model 122e, as the outflow amount NH3_SCRout[k] of NH3 that flows and disappears out of the plurality of catalysts at the current time (time $t=k\Delta t$).

In step S30e, the estimation unit 110e calculates the estimation value of the additive agent (NH3) that is supplied to the first SCR catalyst 40 positioned on the most upstream side and that does not contribute to the removal reaction of NOx in the plurality of catalysts. Specifically, the estimation unit 110e sets the values at the current time (time $t=k\Delta t$) evaluated in steps S16e to S20e, as the input variable vector U of the third model 123e, and evaluates the output variable Z. The estimation unit 110e adopts the output variable Z obtained from the third model 123e, as the amount NH3_thrmlytc[k] of NH3 that does not contribute to the removal reaction of NOx in the plurality of catalysts at the current time (time $t=k\Delta t$).

In step S32e, the estimation unit 110e calculates the estimated value of the total of the adsorption amounts of NH3 that is adsorbed in the plurality of catalysts at the next time (time $t=(k+1)\Delta t$), based on Expression 5 described in step S32 in the first embodiment. Each value to be applied to Expression 5 is the removal performance (or state) of the plurality of catalysts at the current time (time $t=k\Delta t$) that is estimated or calculated by the estimation unit 110e in steps S12, S14e to S30e. After step S32e finishes, the estimation unit 110e outputs the total NH3Ad[k+1] of the adsorption amount of NH3 that is estimated in step S32e. Details are the same as those in the first embodiment.

As described above, the catalyst state estimation apparatus 10e in the sixth embodiment can exert the same effect as the first embodiment. Further, with the catalyst state estimation apparatus 10e in the sixth embodiment, when the plurality of catalysts (the first and second SCR catalysts 40, 41) is provided in the main passage (exhaust pipe 30), the estimation unit 110e can estimate the removal performance of the whole of the plurality of catalysts, by applying the information about the first SCR catalyst 40 positioned on the most upstream side, to catalyst state estimation model 120e. That is, with the catalyst state estimation apparatus 10e in the sixth embodiment, it is possible to estimate the removal performance of the catalyst group CG by regarding the plurality of catalysts (the first and second SCR catalysts 40, 41) on the main passage as one catalyst (that is, the catalyst group CG). Therefore, compared to the case of estimating each removal performance of the catalysts, it is possible to decrease the number of acquisition units (for example, sensors constituting the flow rate acquisition unit for the exhaust gas that flows into the second SCR catalyst 41, the exhaust gas temperature acquisition unit, the NOx concentration acquisition unit, the front-end temperature acquisition unit for the second SCR catalyst 41, and the like) for the information about the catalyst, and to decrease the number of catalyst state estimation models 120e that are previously prepared, and it is possible to reduce the computation load in the catalyst state estimation apparatus 10e. Further, when the plurality of catalysts provided in the main passage is an identical type of catalysts (SCR catalysts in the example of the sixth embodiment), the estimation unit 110e estimates the removal performance by regarding the catalysts as one catalyst (the catalyst group CG). In the case of an identical type of catalysts, there is no difference in information item (for example, the temperature of the catalyst, or the amount of the additive agent that is adsorbed in the catalyst) about the catalyst that affects the removal performance, and therefore, the estimation unit 110e can accurately estimate the removal performance.

Further, with the catalyst state estimation apparatus 10e in the sixth embodiment, the plurality of catalysts disposed in the main passage for the exemplar is regarded as one catalyst (catalyst group), and the learning is performed using the training data acquired from the catalyst group. Thereby, it is possible to construct the first model 121e and/or second model 122e of the catalyst state estimation model 120e. Therefore, in the first model 121e and/or second model 122e of the catalyst state estimation model 120e, it is possible to add influence of the main passage (the exhaust pipe or the like) between the catalysts that belong to the catalyst group. By using the catalyst state estimation model 120e constructed in this way in the estimation process, the estimation unit 110e can accurately estimate the removal performance of the whole of the plurality of the catalyst, without the information about the exhaust pipe or the like between the catalysts (between the first SCR catalyst 40 and the second SCR catalyst 41) in the main passage (exhaust pipe 30).

In the sixth embodiment, as a specific example of the plurality of catalysts, the two SCR catalysts (the first and second SCR catalysts 40, 41) have been described. However, the exhaust gas control system 1e may include three or more SCR catalysts. Further, the exhaust gas control system 1e may include a plurality of NSR catalysts, or may include a plurality of three-way catalysts. The estimation process in the sixth embodiment described in FIG. 11 can be applied to a plurality of identical-type catalysts.

Figure 12:
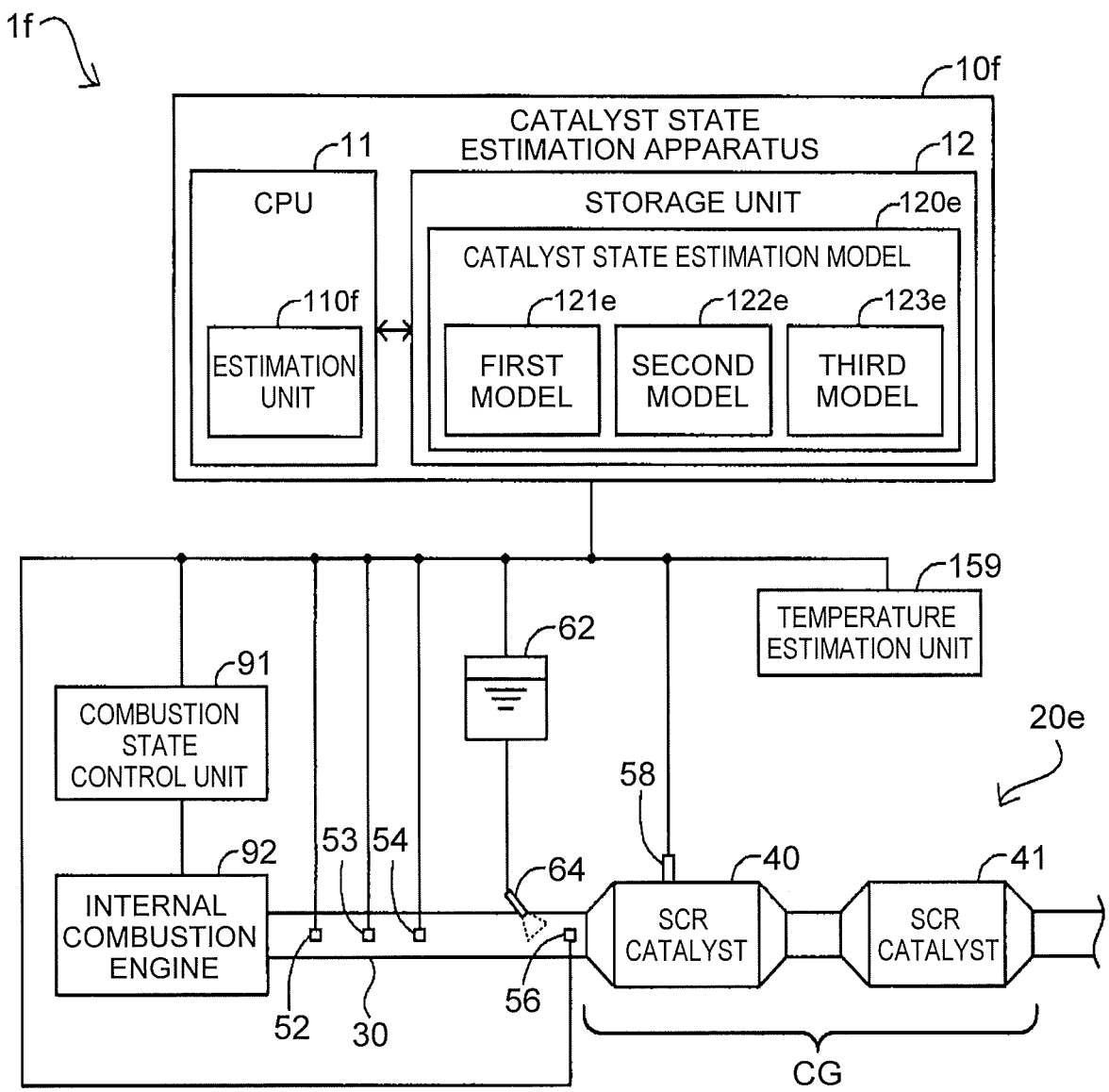
FIG. 12 is a block diagram of an exhaust gas control system in a seventh embodiment.

FIG. 12 is a block diagram of an exhaust gas control system 1f in a seventh embodiment. In the sixth embodiment shown in FIG. 10, the temperatures (bed temperatures) of the catalysts provided in the exhaust gas control apparatus 20e are acquired by the first and second temperature acquisition units 58, 59 provided for the catalysts, respectively. In the exhaust gas control system 1f according to the seven embodiment, instead of the second temperature acquisition unit 59, a catalyst state estimation apparatus 10f includes a temperature estimation unit 159 that estimates the temperature of the catalyst (the second SCR catalyst 41 in the example of FIG. 12) other than the first SCR catalyst 40 positioned on the most upstream side.

The temperature estimation unit 159 calculates the temperature T2 of the second SCR catalyst 41, from the temperature T1 of the first SCR catalyst 40 acquired by the first temperature acquisition unit 58, using a calculation expression, a map or the like that is previously prepared. The temperature estimation unit may calculate the temperature T2 of the second SCR catalyst 41, in consideration of another arbitrary parameter such as the temperature of the exhaust gas from the internal combustion engine 92, the flow rate of the exhaust gas and the reaction heat that is generated when NOx in the exhaust gas reacts in the first SCR catalyst 40, in addition to the temperature T1 of the first SCR catalyst 40 positioned on the most upstream side. Further, even in the case where three or more catalysts are mounted in the exhaust gas control system, the temperature estimation unit 159 can calculate a temperature Tn (n is a natural number for distinguishing the catalysts) of another catalyst, from the temperature T1 or the like of the first SCR catalyst 40 positioned on the most upstream side, using a calculation expression, a map or the like that is previously prepared. In step S16e of the estimation process described in FIG. 11, an estimation unit 110f acquires the temperature Tn of the other catalyst, from the temperature estimation unit 159.

As described above, the catalyst state estimation apparatus 10f in the seventh embodiment can exert the same effect as the first embodiment and the same effect as the sixth embodiment. Further, with the catalyst state estimation apparatus 10f in the seventh embodiment, the temperature estimation unit 159 can estimate the temperature of the second SCR catalyst 41 provided in the main passage (exhaust pipe 30), from the temperature of the first SCR catalyst 40 positioned on the most upstream side, and therefore, it is possible to exclude an acquisition unit (a sensor or the like) that acquires the temperature of the second SCR catalyst 41.

The disclosure is not limited to the above embodiments, and can be carried out as various modes, without departing from the spirit. For example, the following modifications can be made.

In the above embodiments, an example of the configuration of the exhaust gas control system has been described. However, the configuration of the exhaust gas control system can be variously modified. For example, in the exhaust gas control apparatus of the exhaust gas control system, a plurality of catalysts of the SCR catalyst, the NSR catalyst and the three-way catalyst may be combined and mounted, and the catalyst state estimation apparatus may estimate each of the removal performances of the plurality of catalysts. Further, in the exhaust gas control apparatus, a particulate matter removal filter (DPF: Diesel Particulate Filter) that removes particulate matter (PM) may be mounted, and the catalyst state estimation apparatus may estimate the removal performance of the DPF.

For example, the temperature acquisition unit that acquires the bed temperature of the catalyst may be provided at a front position (inlet vicinity) or rear position (outlet vicinity) of the catalyst.

For example, at least one of the flow rate, the NOx concentration, the front-end temperature and the catalyst temperature that are respectively acquired by the flow rate acquisition unit, the NOx concentration acquisition unit, the front-end temperature acquisition unit and the temperature acquisition unit may be a temperature that is estimated using a catalyst state estimation model, instead of the value measured by the sensor. Specifically, for example, the temperature of the catalyst is influenced by a time history, similarly to the adsorption amount of NH3 in the SCR catalyst, the storage amount of NOx in the NSR catalyst and the storage amount of O2 in the three-way catalyst. Therefore, a catalyst state estimation model that can estimate the temperature of the catalyst may be separately created, and the temperature of the catalyst may be estimated by the catalyst state estimation model.

In the above embodiments, an example of the estimation process in the estimation unit has been described (FIG. 4, FIG. 11). However, the content of the estimation process can be variously modified. For example, in the estimation process shown in FIG. 4, the execution order of steps S12 to S24 may be changed, or the execution order of steps S26 to S30 may be changed. Similarly, in the estimation process shown in FIG. 11, the execution order of steps S12 to S24e may be changed, or the execution order of steps S26e to S30e may be changed.

For example, in addition to the above-described steps, the estimation unit may execute the following steps S100 and S102. Steps S100 and S102 can be executed at an arbitrary timing. • Step S100: The estimation unit determines whether the bed temperature T[k] of the SCR catalyst is equal to or higher than a predetermined temperature threshold at which the saturated adsorption amount of NH3 in the SCR catalyst is zero. In the case where the bed temperature T[k] is equal to or higher than the predetermined temperature threshold, the estimation unit resets, to zero, the estimated value NH3Ad[k+1] of the adsorption amount of NH3 that is adsorbed in the SCR catalyst at the next time (time t=(k+1)Δt). • Step S102: The estimation unit sufficiently injects the urea water from the urea pump unit and the urea nozzle until the saturated adsorption amount of NH3 in the SCR catalyst becomes 100 (saturated state). Thereafter, the estimation unit resets, to 100 (saturated adsorption amount), the estimated value NH3Ad[k+1] of the adsorption amount of NH3 that is adsorbed in the SCR catalyst at the next time (time t=(k+1)Δt). Thereby, when errors are accumulated by repeat of the estimation process shown in FIG. 4 or FIG. 11 so that the estimated value deviates from the actual value, the deviation can be reset in steps S100 and S102.

In the sixth and seventh embodiments, the first model is a model that estimates the total of the removal amounts of NOx in the plurality of identical-type catalysts (the first and second SCR catalysts). However, similarly to the first embodiment, the first model may be defined as a model that estimates the NOx removal efficiency in the plurality of catalysts. In this case, for example, in the catalyst group constituted by the plurality of identical-type catalysts, the NOx removal efficiency in the plurality of catalysts can be defined by regarding the inlet of the catalyst positioned on the most upstream side as the inlet of the catalyst group, regarding the outlet of the catalyst positioned on the most downstream side as the outlet of the catalyst group, and multiplying "(NOx amount (or NOx concentration) at the inlet−NOx amount (or NOx concentration) at the outlet)/ NOx amount (or NOx concentration) at the inlet" by 100.

The present disclosure has been described above, based on the embodiments and the modifications. The above modes for carrying out the disclosure are modes for facilitating understanding of the disclosure, and do not limit the disclosure. The disclosure can be modified and improved without departing from the spirit of the disclosure and the scope of the claims, and the equivalent configurations are included in the disclosure. Further, a technical characteristic can be appropriately excluded if the specification does not describe that the technical characteristic is essential.

What is claimed is:

1. A catalyst state estimation apparatus comprising:
a first sensor configured to acquire first information about a catalyst that removes a toxic substance in an exhaust gas, the first sensor being provided in a main passage into which the exhaust gas flows from an internal combustion engine and positioned on a most upstream side in the main passage when a plurality of the catalysts is provided in the main passage, the plurality of the catalysts being an identical type of catalysts;
a second sensor configured to acquire second information about the exhaust gas that flows into the catalyst positioned on the most upstream side;
a third sensor configured to acquire third information about an additive agent that is supplied to the catalyst positioned on the most upstream side;
a memory configured to previously store a catalyst state estimation model that includes at least one mathematical model; and
a processor configured to estimate a removal performance of a whole of the plurality of the catalysts by applying the first information about the catalyst acquired by the first sensor, the second information about the exhaust gas acquired by second sensor, and the third information about the additive agent that is acquired third sensor to the catalyst state estimation model.

2. The catalyst state estimation apparatus according to claim 1, wherein:
the catalyst state estimation model includes a first model configured by a machine learning model, the first model receiving at least one of a temperature of a front end of the catalyst in the main passage, a temperature of the catalyst and an adsorption amount of the additive agent that is adsorbed in the catalyst at a last time, as the first information about the catalyst, and outputting a removal efficiency for nitrogen oxide in the catalyst; and
the processor is configured to estimate the removal efficiency for the nitrogen oxide as the removal performance of the catalyst, using the first model.

3. The catalyst state estimation apparatus according to claim 2, wherein:
the catalyst state estimation model further includes a second model configured by the machine learning model and a third model configured by a physical model;
the second model receives at least one of the temperature of the front end of the catalyst in the main passage, the temperature of the catalyst, the adsorption amount of the additive agent that is adsorbed in the catalyst at the last time, a time derivative value of the temperature of the catalyst and a ratio of the adsorption amount to a saturated adsorption amount of the additive agent in the catalyst, as the first information about the catalyst, and outputs an outflow amount of the additive agent that flows out of the catalyst;
the third model receives at least one of the temperature of the front end of the catalyst in the main passage and the temperature of the catalyst, as the first information about the catalyst, and outputs an amount of an additive agent that does not contribute to a removal reaction of nitrogen agent in the catalyst; and
the processor is configured to estimate the outflow amount as the removal performance of the catalyst, using the second model, and is configured to estimate the amount of the additive agent that does not contribute to the removal reaction of the nitrogen oxide in the catalyst as the removal performance of the catalyst, using the third model.

4. The catalyst state estimation apparatus according to claim 3, wherein:
the catalyst state estimation model is a model that receives the removal efficiency for the nitrogen oxide at a current time that is estimated by the first model, the outflow amount at the current time that is estimated by the second model and the amount of the additive agent at the current time that does not contribute to the removal reaction of the nitrogen oxide in the catalyst and that is estimated by the third model, and evaluates the adsorption amount of the additive agent in the catalyst at a next time, using a physical law; and the processor is configured to estimate the adsorption amount at the next time as the removal performance of the catalyst, using the catalyst state estimation model.

5. The catalyst state estimation apparatus according to claim 4, wherein:

the first model and the second model further receive at least one of a temperature of the exhaust gas, a flow rate of the exhaust gas and an amount of the nitrogen oxide that is contained in the exhaust gas, as second information about the exhaust gas, and receives an inflow amount of the additive agent that flows into the catalyst, as third information about the additive agent; and the third model further receives the temperature of the exhaust gas, as the second information about the exhaust gas, and receives the inflow amount of the additive agent that flows into the catalyst, as the third information about the additive agent.

6. The catalyst state estimation apparatus according to claim 4, wherein the catalyst state estimation model includes a plurality of the first models and a plurality of the second models, the plurality of the first models being created using training data acquired from a plurality of the catalysts having different deterioration degrees, the plurality of the second models being created using the training data.

7. The catalyst state estimation apparatus according to claim 1, wherein:

the catalyst state estimation model includes a second model configured by a machine learning model, the second model receiving at least one of a temperature of a front end of the catalyst in the main passage, a temperature of the catalyst, an adsorption amount of the additive agent that is adsorbed in the catalyst at a last time, a time derivative value of the temperature of the catalyst and a ratio of the adsorption amount to a saturated adsorption amount of the additive agent in the catalyst, as the first information about the catalyst, and outputting an outflow amount of the additive agent that flows out of the catalyst; and the processor is configured to estimate the outflow amount as the removal performance of the catalyst, using the second model.

8. The catalyst state estimation apparatus according to claim 1, wherein:

the catalyst state estimation model includes a third model configured by a physical model, the third model receiving at least one of a temperature of a front end of the catalyst in the main passage and a temperature of the catalyst, as the first information about the catalyst, and outputting an amount of the additive agent that does not contribute to a removal reaction of nitrogen oxide in the catalyst; and the processor is configured to estimate the amount of the additive agent that does not contribute to the removal reaction of the nitrogen oxide in the catalyst as the removal performance of the catalyst, using the third model.

9. The catalyst state estimation apparatus according to claim 1, wherein:

the catalyst state estimation model includes a first model configured by a machine learning model, the first model receiving at least one of a temperature of a front end of the catalyst positioned on the most upstream side, temperatures of the catalysts and a total of adsorption amounts of the additive agent that is adsorbed in the plurality of the catalysts at a last time, as the first information about the catalyst, and outputting a total of removal amounts of nitrogen oxide in the plurality of the catalysts; and the processor is configured to estimate the total of the removal amounts of the nitrogen oxide as the removal performance, using the first model.

10. The catalyst state estimation apparatus according to claim 9, wherein:

the catalyst state estimation model includes a second model configured by the machine learning model and a third model configured by a physical model;

the second model receives at least one of the temperature of the front end of the catalyst positioned on the most upstream side, the temperatures of the catalysts, the total of the adsorption amounts of the additive agent that is adsorbed in the plurality of the catalysts at the last time, time derivative values of the temperatures of the catalysts, a ratio of the total of the adsorption amounts to a total of saturated adsorption amounts of the additive agent in the plurality of the catalysts, as the first information about the catalyst, and outputs an outflow amount of the additive agent that flows out of the catalyst positioned on a most downstream side in the main passage;

the third model inputs at least one of the temperature of the front end of the catalyst positioned on the most upstream side and the temperatures of the catalysts, as the information about the catalyst, and outputs an amount of an additive agent that is supplied to the catalyst positioned on the most upstream side and that does not contribute to a removal reaction of nitrogen oxide in the plurality of the catalysts; and the processor is configured to estimate the outflow amount as the removal performance, using the second model, and is configured to estimate the amount of the additive agent that does not contribute to the removal reaction of the nitrogen oxide as the removal performance, using the third model.

11. The catalyst state estimation apparatus according to claim 10, wherein:

the catalyst state estimation model is a model that receives the total of the removal amount of the nitrogen oxide at a current time that is estimated by the first model, the outflow amount at the current time that is estimated by the second model and the amount of the additive agent at the current time that does not contribute to the removal reaction of the nitrogen oxide and that is estimated by the third model, and evaluates the total of the adsorption amounts of the additive agent that is adsorbed in the plurality of the catalysts at a next time, using a physical law; and the processor is configured to estimate the total of the adsorption amounts at the next time as the removal performance, using the catalyst state estimation model.

12. The catalyst state estimation apparatus according to claim 11, wherein:

the first model and the second model further receives at least one of a temperature of the exhaust gas, a flow rate of the exhaust gas and an amount of the nitrogen oxide that is contained in the exhaust gas, as the second information about the exhaust gas, and receives an inflow amount of the additive agent that flows into the catalyst positioned on the most upstream side, as the third information about the additive agent; and the third model further receives the temperature of the exhaust gas, as the second information about the exhaust gas, and receives the inflow amount of the additive agent that flows into the catalyst positioned on the most upstream side, as the third information about the additive agent.

13. The catalyst state estimation apparatus according to claim 11, wherein:
the catalyst state estimation model includes at least one model of the first model and the second model that are created using training data acquired from a catalyst group; and
the catalyst group is constituted by a plurality of the catalysts that is disposed in a main passage for an exemplar, the plurality of the catalysts being the identical type of catalysts, and in the catalyst group, an inlet of the catalyst positioned on a most upstream side in the main passage for the exemplar is regarded as an inlet of the catalyst group, and an outlet of the catalyst positioned on a most downstream side in the main passage for the exemplar is regarded as an outlet of the catalyst group.

14. The catalyst state estimation apparatus according to claim 1, wherein:
the catalyst state estimation model includes a second model configured by a machine learning model, the second model receiving at least one of a temperature of a front end of the catalyst positioned on the most upstream side, temperatures of the catalysts, a total of adsorption amounts of the additive agent that is adsorbed in the plurality of the catalysts at a last time, time derivative values of the temperatures of the catalysts and a ratio of the total of the adsorption amounts to a total of saturated adsorption amounts of the additive agent in the plurality of the catalysts, as the first information about the catalyst, and outputting an outflow amount of the additive agent that flows out of the catalyst positioned on a most downstream side in the main passage; and
the processor is configured to estimate the outflow amount of the removal performance, using the second model.

15. The catalyst state estimation apparatus according to claim 1, wherein:
the catalyst state estimation model includes a third model configured by a physical model, the third model receiving at least one of a temperature of a front end of the catalyst positioned on the most upstream side and temperatures of the catalysts, as the first information about the catalyst, and outputting an amount of the additive agent that is supplied to the catalyst positioned on the most upstream side and that does not contribute to a removal reaction of nitrogen oxide in the plurality of the catalysts; and
the processor is configured to estimate the amount of the additive agent that does not contribute to the removal reaction of the nitrogen oxide as the removal performance, using the third model.

16. The catalyst state estimation apparatus according to claim 1, further comprising
a temperature estimation unit that estimates, from a temperature of the catalyst positioned on the most upstream side, a temperature of another catalyst of the catalysts provided in the main passage.

17. A catalyst state estimation method with an information processing apparatus,
the information processing apparatus including:
a first sensor that acquires first information about a catalyst that removes a toxic substance in an exhaust gas, the first sensor being provided in a main passage into which the exhaust gas flows from an internal combustion engine and positioned on a most upstream side in the main passage when a plurality of the catalysts is provided in the main passage, the plurality of the catalysts being an identical type of catalysts,
a second sensor that acquires second information about the exhaust gas that flows into the catalyst positioned on the most upstream side,
a third sensor that acquires third information about an additive agent that is supplied to the catalyst positioned on the most upstream side,
a memory that previously stores a catalyst state estimation model including at least one mathematical model, and
a processor;
the catalyst state estimation method comprising:
acquiring, by the first sensor, the first information about a catalyst,
acquiring, by the second sensor, the second information about the exhaust gas,
acquiring, by the third sensor, the third information about the additive agent, and
estimating, by the processor, a removal performance of the catalyst by applying the first information, the second information, and the third information to the catalyst state estimation model.

18. A non-transitory recording medium in which a program is stored, wherein:
the program causes a computer to execute an acquisition step and an estimation step;
the acquisition step is a step in which:
a first sensor acquires first information about a catalyst that removes a toxic substance in an exhaust gas, the first sensor being provided in a main passage into which the exhaust gas flows from an internal combustion engine and positioned on a most upstream side in the main passage when a plurality of the catalysts is provided in the main passage, the plurality of the catalysts being an identical type of catalysts,
a second sensor acquires second information about the exhaust gas that flows into the catalyst positioned on the most upstream side, and
a third sensor acquires third information about an additive agent that is supplied to the catalyst positioned on the most upstream side; and
the estimation step is a step in which a processor estimates a removal performance of the catalyst by applying the first information about the catalyst, the second information about the exhaust gas, and the third information about an additive agent to a catalyst state estimation model, the catalyst state estimation model including at least one mathematical model and being previously stored in a memory.

* * * * *